United States Patent
Ljungblad et al.

(10) Patent No.: US 12,504,422 B2
(45) Date of Patent: Dec. 23, 2025

(54) METHOD AND SYSTEM FOR TRACER-AIDED DETERMINATION AND CLASSIFICATION OF INTOXICATING SUBSTANCE IN BREATH SAMPLE

(71) Applicant: Automotive Coalition for Traffic Safety, Inc.

(72) Inventors: Jonas Ljungblad, Stockholm (SE); Bertil Hök, Västerås (SE); Martin Åhlenius, Västerås (SE)

(73) Assignee: Automotive Coalition for Traffic Safety, Inc., Leesburg, VA (US)

( * ) Notice: Subject to any disclaimer, the term of this patent is extended or adjusted under 35 U.S.C. 154(b) by 374 days.

(21) Appl. No.: 17/794,277

(22) PCT Filed: Jan. 29, 2021

(86) PCT No.: PCT/SE2021/050061
§ 371 (c)(1),
(2) Date: Jul. 21, 2022

(87) PCT Pub. No.: WO2021/154147
PCT Pub. Date: Aug. 5, 2021

(65) Prior Publication Data
US 2023/0051132 A1 Feb. 16, 2023

(30) Foreign Application Priority Data
Jan. 31, 2020 (SE) .................... 2050105-2

(51) Int. Cl.
*A61B 5/00* (2006.01)
*B60K 28/06* (2006.01)
(Continued)

(52) U.S. Cl.
CPC ....... *G01N 33/4972* (2013.01); *A61B 5/4845* (2013.01); *A61B 5/7239* (2013.01);
(Continued)

(58) Field of Classification Search
CPC ......... A61B 5/4845; A61B 5/082; A61B 5/18; A61B 5/7267; A61B 5/7264; A61B 5/742;
(Continued)

(56) References Cited

U.S. PATENT DOCUMENTS 3,283,563 A 11/1966 Turner et al.
3,301,482 A 1/1967 Bullen
(Continued)

FOREIGN PATENT DOCUMENTS

CN 1586944 3/2005
CN 101292158 10/2008
(Continued)

OTHER PUBLICATIONS

Hök et al., "Breath Analyzer for Alcolocks and Screening Devices", IEEE Sensors Journal, vol. 10, No. 1, Jan. 2010, pp. 10-15.
(Continued)

*Primary Examiner* — Jeffrey P Aiello
(74) *Attorney, Agent, or Firm* — Pandiscio & Pandiscio

(57) ABSTRACT

The present invention relates to a breath analyzing system and method. In particular the invention relates to a breath analyzing system and method arranged to provide tracer-aided classification of the presence of a breath intoxicating substance above a limit concentration and providing status to a user about the progression of the classification. The method/system detects a peak in the tracer signal and defines an evaluation period corresponding to the duration of the peak. Measurements classification of the concentration of the intoxicating substance is used for the evaluation period, and if required to achieve a result, for a plurality of evaluation periods.

21 Claims, 8 Drawing Sheets

(51) Int. Cl.
 *G01N 21/3504* (2014.01)
 *G01N 33/497* (2006.01)
(52) U.S. Cl.
 CPC ............ *A61B 5/7264* (2013.01); *A61B 5/742* (2013.01); *B60K 28/06* (2013.01); *G01N 21/3504* (2013.01)
(58) Field of Classification Search
 CPC .. A61B 5/087; G01N 33/4972; G01N 33/497; G01N 21/3504; B60K 28/063; B60K 28/06; B60W 2540/24; B60W 2540/26; B60W 2040/0836; B60W 40/08; G06F 2218/10
 USPC .................. 73/23.3; 180/272, 287; 340/576; 422/84; 702/179, 181, 19, 24, 104, 183, 702/23, 22, 85, 82
 See application file for complete search history.

(56) References Cited

U.S. PATENT DOCUMENTS

| | | | |
|---|---|---|---|
| 3,780,311 | A | 12/1973 | Brown |
| 3,792,272 | A | 2/1974 | Harte et al. |
| 3,792,351 | A | 2/1974 | Ireland |
| 3,830,630 | A | 8/1974 | Kiefer et al. |
| 3,897,659 | A | 8/1975 | Henry |
| 4,090,078 | A | 5/1978 | Heim |
| 4,294,327 | A | 10/1981 | Howard |
| 4,535,620 | A | 8/1985 | Cunningham |
| 4,678,057 | A | 7/1987 | Elfman et al. |
| 4,749,553 | A | 6/1988 | Lopez et al. |
| 4,843,377 | A | 6/1989 | Fuller et al. |
| 4,868,545 | A | 9/1989 | Jones |
| 4,916,435 | A | 4/1990 | Fuller |
| 4,975,581 | A | 12/1990 | Robinson et al. |
| 4,996,161 | A | 2/1991 | Conners et al. |
| 5,006,315 | A | 4/1991 | Maroulis et al. |
| 5,303,575 | A | 4/1994 | Brown et al. |
| 5,426,415 | A | 6/1995 | Prachar et al. |
| 5,458,853 | A | 10/1995 | Porter et al. |
| 5,485,850 | A | 1/1996 | Dietz |
| 5,544,276 | A | 8/1996 | Loux et al. |
| 5,652,398 | A | 7/1997 | Johnson |
| 5,655,530 | A | 8/1997 | Messerschmidt |
| 5,693,944 | A | 12/1997 | Rich |
| 5,731,581 | A | 3/1998 | Fischer et al. |
| 5,746,973 | A | 5/1998 | Naraqhi |
| 5,823,951 | A | 10/1998 | Messerschmidt |
| 5,830,112 | A | 11/1998 | Wanq et al. |
| 5,877,345 | A | 3/1999 | Bauer et al. |
| 5,906,203 | A | 5/1999 | Klockseth et al. |
| 5,955,886 | A | 9/1999 | Cohen et al. |
| 5,971,937 | A | 10/1999 | Ekstrom |
| 6,123,674 | A | 9/2000 | Rich |
| 6,129,680 | A | 10/2000 | Mottram |
| 6,142,951 | A | 11/2000 | Park |
| 6,152,876 | A | 11/2000 | Robinson et al. |
| 6,157,041 | A | 12/2000 | Thomas et al. |
| 6,229,908 | B1 | 5/2001 | Edmonds et al. |
| 6,266,353 | B1 | 7/2001 | Freitas et al. |
| 6,441,388 | B1 | 8/2002 | Thomas et al. |
| 6,468,222 | B1 | 10/2002 | Mault et al. |
| 6,488,635 | B1 | 12/2002 | Mottram |
| 6,528,809 | B1 | 3/2003 | Thomas et al. |
| 6,608,399 | B2 | 8/2003 | McConnell et al. |
| 6,622,032 | B1 | 9/2003 | Robinson et al. |
| 6,684,099 | B2 | 1/2004 | Ridder et al. |
| 6,726,636 | B2 | 4/2004 | Der Ghazarian et al. |
| 6,748,301 | B1 | 6/2004 | Ryu |
| 6,794,988 | B1 | 9/2004 | Weiss et al. |
| 6,862,091 | B2 | 3/2005 | Johnson |
| 6,983,176 | B2 | 1/2006 | Gardner et al. |
| 7,016,713 | B2 | 3/2006 | Gardner et al. |
| 7,092,832 | B2 | 8/2006 | Brown |
| 7,098,037 | B2 | 8/2006 | Haas et al. |
| 7,173,524 | B2 | 2/2007 | Ponziani |
| 7,202,091 | B2 | 4/2007 | Jones et al. |
| 7,386,152 | B2 | 6/2008 | Rowe et al. |
| 7,446,878 | B2 | 11/2008 | Ridder et al. |
| 7,671,752 | B2 | 3/2010 | Sofer |
| 7,736,903 | B2 | 6/2010 | Lambert et al. |
| 7,764,982 | B2 | 7/2010 | Dalke et al. |
| 7,848,605 | B2 | 12/2010 | Ridder et al. |
| 7,855,027 | B2 | 12/2010 | Bayer et al. |
| 7,919,754 | B2 | 4/2011 | Hok et al. |
| 7,993,281 | B2 | 8/2011 | Stock et al. |
| 8,183,527 | B2 | 5/2012 | Taguchi et al. |
| 8,285,010 | B2 | 10/2012 | Rowe |
| 8,306,595 | B2 | 11/2012 | Osaki et al. |
| 8,377,705 | B2 | 2/2013 | Lambert et al. |
| 8,469,134 | B2 | 6/2013 | Osaki et al. |
| 8,605,959 | B2 | 12/2013 | Kangas |
| 8,773,390 | B1 | 7/2014 | Clark |
| 9,068,885 | B2 | 6/2015 | Kluczynski et al. |
| 9,073,431 | B2 | 7/2015 | Takahashi |
| 9,163,718 | B2 | 10/2015 | Nelson |
| 9,746,454 | B2 | 8/2017 | Hok et al. |
| 9,758,039 | B2 | 9/2017 | Hannon |
| 9,823,237 | B2 | 11/2017 | Martin et al. |
| 10,151,744 | B2 | 12/2018 | Hok et al. |
| 11,104,227 | B2 * | 8/2021 | Hök .................... B60K 28/063 |
| 11,391,724 | B2 | 7/2022 | Hok et al. |
| 2002/0084130 | A1 | 7/2002 | Der Ghazarian et al. |
| 2002/0140289 | A1 | 10/2002 | McConnell et al. |
| 2003/0039299 | A1 | 2/2003 | Horovitz |
| 2003/0048000 | A1 | 3/2003 | Harter |
| 2003/0085284 | A1 | 5/2003 | Bremer et al. |
| 2004/0093957 | A1 | 5/2004 | Buess et al. |
| 2004/0260194 | A1 | 12/2004 | Baver |
| 2005/0241871 | A1 | 11/2005 | Stewart et al. |
| 2006/0058697 | A1 | 3/2006 | Mochizuki et al. |
| 2006/0153740 | A1 | 7/2006 | Sultan et al. |
| 2006/0154377 | A1 | 7/2006 | Lambert et al. |
| 2006/0167349 | A1 | 7/2006 | Gardner et al. |
| 2006/0206034 | A1 | 9/2006 | Stock et al. |
| 2006/0210120 | A1 | 9/2006 | Rowe et al. |
| 2006/0253711 | A1 | 11/2006 | Kallmann |
| 2007/0077176 | A1 | 4/2007 | Lambert et al. |
| 2007/0142720 | A1 | 6/2007 | Ridder et al. |
| 2007/0144812 | A1 | 6/2007 | Stewart et al. |
| 2007/0245801 | A1 | 10/2007 | Stock |
| 2008/0006077 | A1 | 1/2008 | Crabtree et al. |
| 2008/0045806 | A1 | 2/2008 | Keppler |
| 2008/0061238 | A1 | 3/2008 | Hok et al. |
| 2008/0107309 | A1 | 5/2008 | Carni |
| 2008/0171947 | A1 | 7/2008 | Ruffert |
| 2008/0228098 | A1 | 9/2008 | Popov et al. |
| 2008/0252412 | A1 | 10/2008 | Larsson et al. |
| 2008/0319286 | A1 | 12/2008 | Ridder et al. |
| 2008/0319288 | A1 | 12/2008 | Ochiai et al. |
| 2009/0007634 | A1 | 1/2009 | Mitchell |
| 2009/0039267 | A1 | 2/2009 | Arndt et al. |
| 2009/0087920 | A1 | 4/2009 | Pettersson et al. |
| 2009/0248260 | A1 | 10/2009 | Flanagan |
| 2009/0293589 | A1 | 12/2009 | Freund et al. |
| 2010/0010325 | A1 | 1/2010 | Ridder et al. |
| 2010/0028210 | A1 | 2/2010 | Ozaki et al. |
| 2010/0031718 | A1 | 2/2010 | Heil |
| 2010/0036592 | A1 | 2/2010 | Osaki et al. |
| 2010/0063409 | A1 | 3/2010 | Hok |
| 2010/0068673 | A1 | 3/2010 | Yamada et al. |
| 2010/0188232 | A1 * | 7/2010 | Lambert ............ G01N 33/4972 73/23.3 |
| 2010/0252737 | A1 | 10/2010 | Fournel et al. |
| 2010/0268425 | A1 | 10/2010 | Pettersson et al. |
| 2010/0327167 | A1 | 12/2010 | Koop et al. |
| 2011/0178420 | A1 | 7/2011 | Ridder et al. |
| 2011/0283770 | A1 | 11/2011 | Hok |
| 2011/0302992 | A1 | 12/2011 | Robbins et al. |
| 2011/0308297 | A1 | 12/2011 | Tsuzuki et al. |
| 2011/0309932 | A1 | 12/2011 | Arrinqdale et al. |
| 2012/0112879 | A1 | 5/2012 | Ekchian et al. |
| 2013/0110311 | A1 | 5/2013 | Ver Steeg |

(56) References Cited

U.S. PATENT DOCUMENTS

| | | |
|---|---|---|
| 2013/0231871 A1 | 9/2013 | Hok |
| 2014/0002237 A1 | 1/2014 | Infante et al. |
| 2014/0156149 A1 | 6/2014 | Feit |
| 2014/0260537 A1 | 9/2014 | Nash |
| 2014/0297061 A1 | 10/2014 | Takahashi |
| 2014/0318293 A1 | 10/2014 | Nelson |
| 2014/0377877 A1 | 12/2014 | Bürgi et al. |
| 2015/0066238 A1 | 3/2015 | Todd et al. |
| 2015/0219620 A1* | 8/2015 | Hok ............... A61B 5/0059 73/23.3 |
| 2015/0233897 A1 | 8/2015 | Hök |
| 2016/0356764 A1 | 12/2016 | Martin et al. |
| 2017/0050518 A1 | 2/2017 | Steeg et al. |
| 2017/0074857 A1 | 3/2017 | Dennis et al. |
| 2017/0274768 A1 | 9/2017 | Hök et al. |
| 2018/0153440 A1* | 6/2018 | Lee ............ A61M 16/0066 |
| 2020/0148231 A1* | 5/2020 | Hassani ........ A61B 5/02438 |

FOREIGN PATENT DOCUMENTS

| | | |
|---|---|---|
| CN | 101334399 A | 12/2008 |
| CN | 101624015 | 1/2010 |
| CN | 101631497 | 1/2010 |
| CN | 102316801 A | 1/2012 |
| CN | 101354394 | 10/2012 |
| CN | 102854303 | 1/2013 |
| CN | 103692912 A | 4/2014 |
| CN | 104737015 A | 6/2015 |
| CN | 104816692 | 8/2015 |
| CN | 105109338 B | 10/2018 |
| DE | 4127599 A1 | 2/1993 |
| DE | 19811872 | 8/1999 |
| DE | 19938064 | 8/2000 |
| DE | 10157907 | 6/2003 |
| DE | 102006018970 B3 | 5/2007 |
| DE | 102011106410 | 8/2012 |
| EP | 0752584 | 1/1997 |
| EP | 0791899 | 8/1997 |
| EP | 1441212 | 7/2004 |
| EP | 1688741 | 8/2006 |
| EP | 3304045 | 4/2008 |
| EP | 3433611 | 1/2019 |
| GB | 2431470 | 4/2007 |
| GB | 2442980 | 4/2008 |
| JP | 11-104112 | 4/1999 |
| JP | 2000-098191 | 4/2000 |
| JP | 2001-057440 | 2/2001 |
| JP | 2001-503524 | 3/2001 |
| JP | 2002-116141 | 4/2002 |
| JP | 2004-245799 | 9/2004 |
| JP | 2004-287181 | 10/2004 |
| JP | 2004-305494 | 11/2004 |
| JP | 2005-157599 | 6/2005 |
| JP | 2005-227553 | 8/2005 |
| JP | 2005-296252 | 10/2005 |
| JP | 2006-98058 | 4/2006 |
| JP | 2006-352009 | 12/2006 |
| JP | 2007-147592 | 6/2007 |
| JP | 2007-333848 | 12/2007 |
| JP | 2008-177473 | 7/2008 |
| JP | 2008-192733 | 8/2008 |
| JP | 2008-203774 | 9/2008 |
| JP | 2008-253455 | 10/2008 |
| JP | 2008-291710 | 12/2008 |
| JP | 2008-302915 | 12/2008 |
| JP | 2008-308037 | 12/2008 |
| JP | 2009-217633 | 9/2009 |
| JP | 2009-257768 | 11/2009 |
| JP | 2010-036799 | 2/2010 |
| JP | 2010-139319 | 6/2010 |
| JP | 2010-241369 | 10/2010 |
| JP | 2011-153956 | 8/2011 |
| JP | 2012-517276 | 8/2012 |
| JP | 2012-198648 | 10/2012 |
| JP | 5141524 B2 | 2/2013 |
| JP | 2016-538193 | 12/2016 |
| JP | 6496244 | 4/2019 |
| KR | 20080110567 | 12/2008 |
| KR | 20130107738 A * | 3/2012 | ............ A61B 5/097 |
| SE | 536782 | 8/2014 |
| SE | 536784 | 8/2014 |
| WO | WO 92/22813 | 12/1992 |
| WO | WO 95/26889 | 10/1995 |
| WO | WO 97/000443 | 1/1997 |
| WO | WO 98/20346 | 5/1998 |
| WO | WO 2001/008554 | 2/2001 |
| WO | WO 2004/090786 | 10/2004 |
| WO | WO 2005/051700 | 6/2005 |
| WO | WO 2007/046745 | 4/2007 |
| WO | WO 2008/108714 | 9/2008 |
| WO | WO 2009/048809 | 4/2009 |
| WO | WO 2010/067144 | 6/2010 |
| WO | WO 2010/085716 | 7/2010 |
| WO | WO 2010/093317 | 8/2010 |
| WO | WO 2012/064252 | 5/2012 |
| WO | WO 2013/081519 | 6/2013 |
| WO | WO 2014/031071 | 2/2014 |
| WO | WO 2014/031072 | 2/2014 |
| WO | WO 2016/195803 | 12/2016 |
| WO | WO 2017/164953 | 9/2017 |

OTHER PUBLICATIONS

International Search Report and Written Opinion dated Apr. 22, 2021, issued in corresponding International Patent Application No. PCT/SE2021/050061.

Blincoe, L. J. et al., The Economic and Societal Impact Of Motor Vehicle Crashes, 2010 (Revised), National Highway Traffic Safety Administration, May 2015 (Revised), DOT HS 812 013.

Dhokalia et al., Resting End-Tidal CO2 Association With Age, Gender, and Personailty, Psychosomatic Medicine, vol. 60, 1998, pp. 33-37.

Extended European Search Report EP 13 83 0956 dated Jul. 13, 2015.

Extended European Search Report EP 13 83 1692 dated Jul. 13, 2015.

Giebel, Brian M., Thesis and Dissertation, "Advancement and Application of Gas Chromatography Isotope Ratio Mass Spectrometry Techniques for Atmospheric Trace Gas Analysis," Published 2011, 252 total pages.

Hok, B. et al., Breath Analyzer for Alcolocks and Screening Devices, IEEE Sensors Journal, Dec. 2010, vol. 10. No. 1, pp. 10-15.

International Search Report dated Feb. 3, 2014 for PCT/SE2013/050991.

International Search Report dated Jan. 31, 2014 for PCT/SE2013/050990.

Lambert et al., Passive Sensing of Driver Intoxication, SAE Technical Paper 2006-01-1321, 2006, SAE International.

Ljungblad, J. et al., Development and Evaluation of Algorithms for Breath Alcohol Screening, Sensors, Apr. 2016, vol. 16, No. 469, pp. 1-7.

Talbert, Bruce, et al., "A Study of Regulators for Delivering Gases Containing Low Concentrations of Hydrogen Sulfide," LCGC North America, 22(6):562, 564, 567-568 (2004).

Traffic Safety Facts, 2013 Data: Alcohol-Impaired Driving, National Highway Traffic Safety Administration, Dec. 2014, DOT HS 812 102.

* cited by examiner

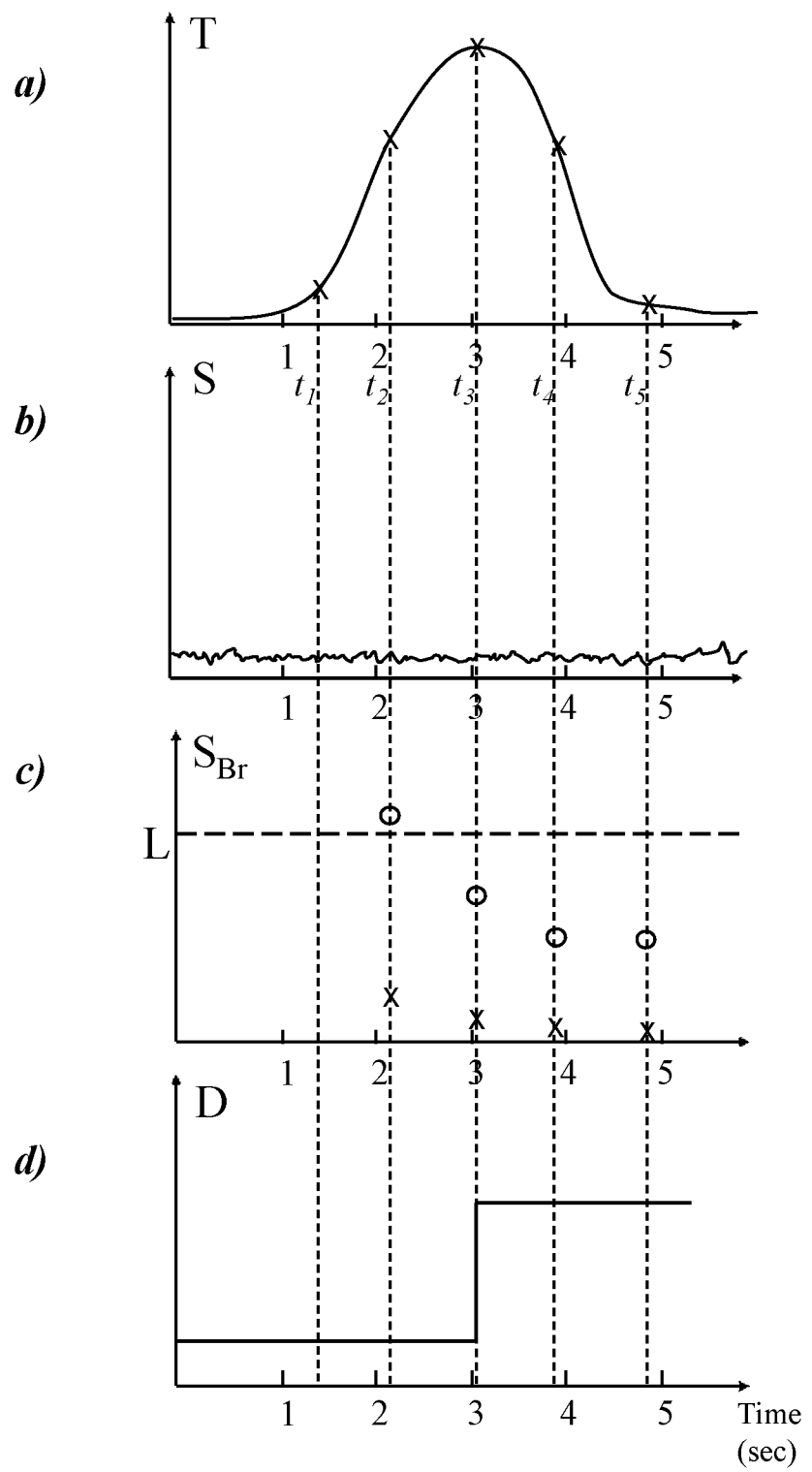
*Fig. 3a-d*

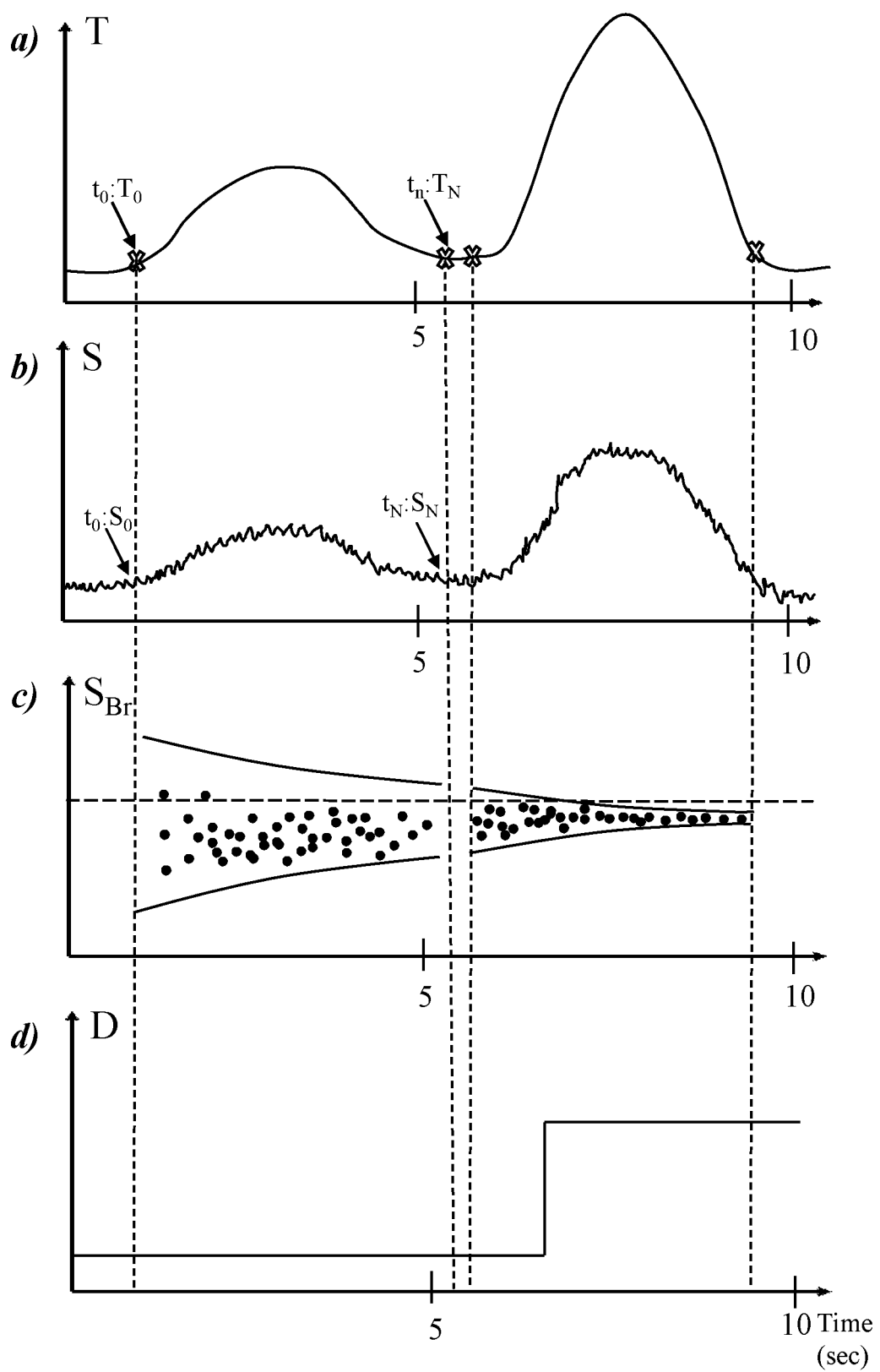
Fig. 4a-d

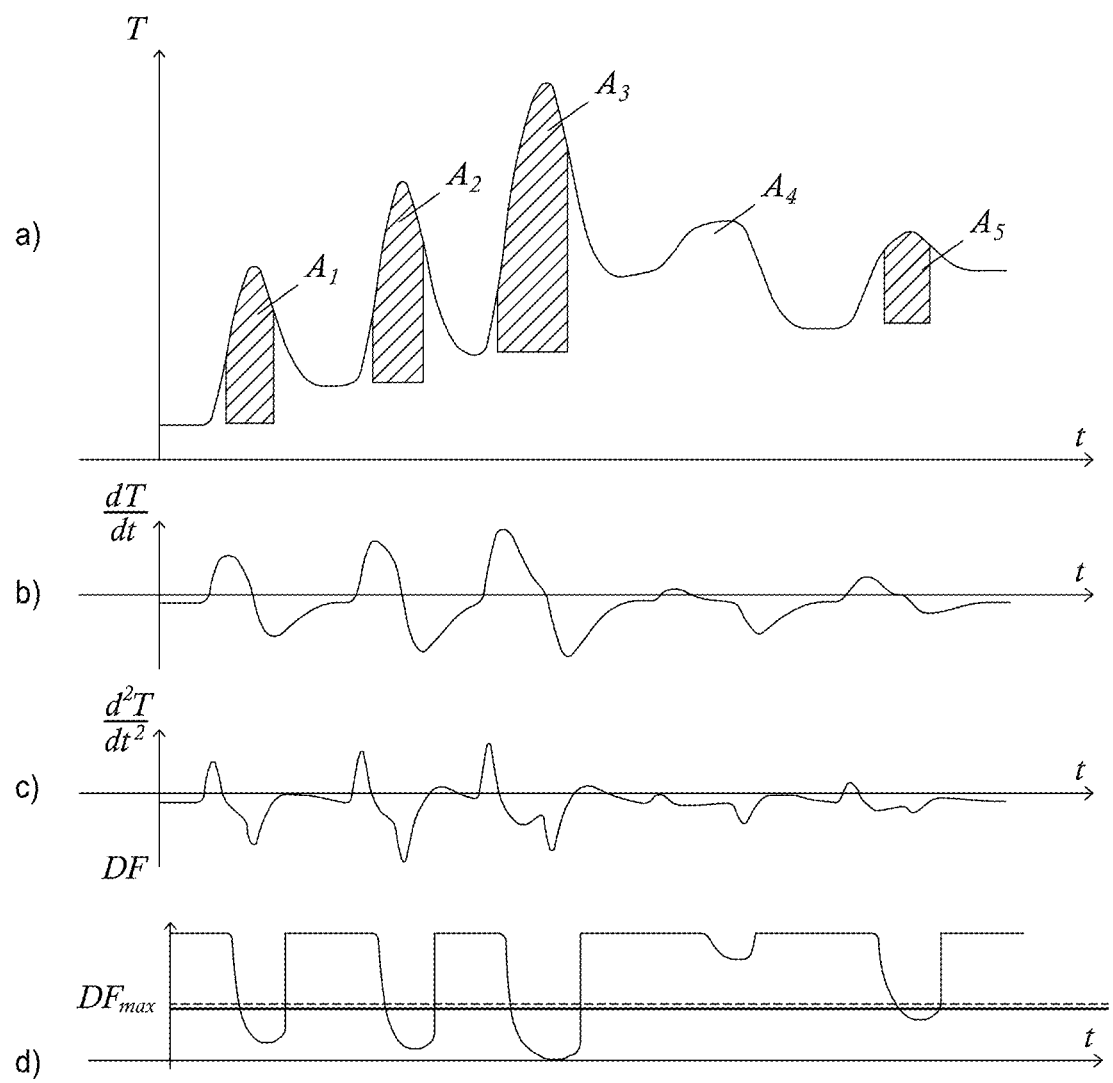
FIG. 5a-d

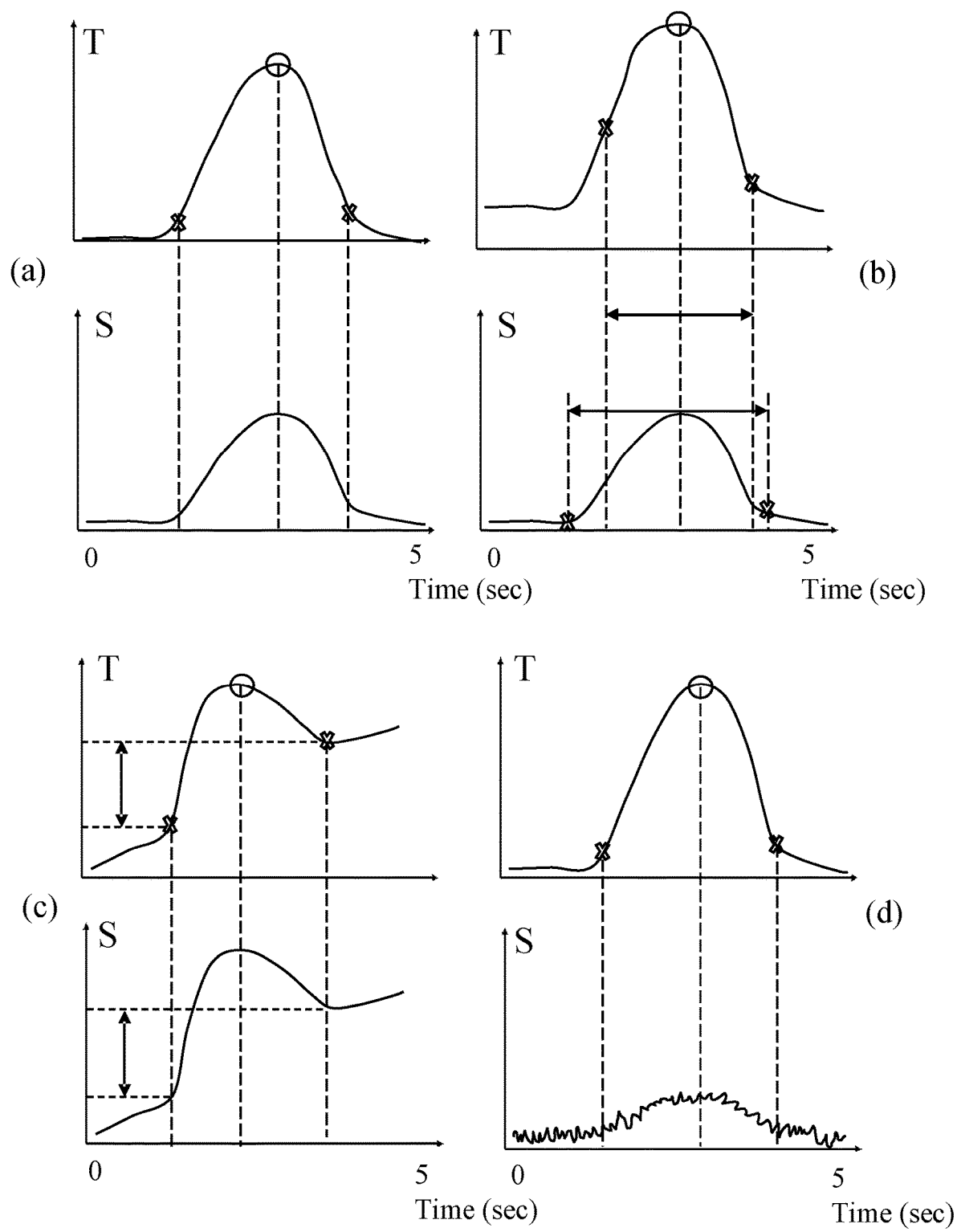
Fig. 7a-d

METHOD AND SYSTEM FOR TRACER-AIDED DETERMINATION AND CLASSIFICATION OF INTOXICATING SUBSTANCE IN BREATH SAMPLE

FIELD OF THE INVENTION

The present invention relates to a breath analyzing system and method. In particular the invention relates to a breath analyzing system and method arranged to provide rapid tracer-aided determination and classification of the presence of a breath intoxicating substance above a limit concentration providing status to a user about the progression of the classification.

BACKGROUND OF THE INVENTION

Breath analyzing equipment is becoming increasingly common, not the least in vehicles as a measure to detect and prevent driving under the influence of intoxicating substances, in particular, ethyl alcohol (ethanol). The breath analyzing equipment may be a stand-alone, even handheld, unit that gives a measured value of the content of a substance or substances in the driver's breath. Alternatively, breath analyzing equipment may be part of a system wherein also including equipment for identifying the driver and/or immobilizing the vehicle. Such breath analyzing equipment is typically permanently mounted in the vehicle and may be an integral part of the dashboard, for example. Breath analyzing equipment may also be stationary systems used to control access to a work area, a vehicle fleet depot or the like.

To provide a breath analyzer that has appropriate sensitivity, is reliable and provides a reasonably fast analysis is far from trivial. This is especially true if the breath analyzing equipment should be able to detect a plurality of substances and not being disturbed by variation in moisture, $CO_2$ content etc. Breath analyzing equipment that fulfills these requirements are described in for example U.S. Pat. Nos. 7,919,754 and 9,746,454, hereby incorporated by reference.

The breath analyzing equipment may be part of a system also including equipment for identifying the driver and/or immobilizing the vehicle, so called "alcolocks". Such breath analyzing equipment is typically permanently mounted in the vehicle and may be an integral part of the dashboard, for example, and connected to the control system of the vehicle. Alcolocks are in widespread use in offender programs as a mandatory accessory for rehabilitation of car owners who have been convicted for drunk driving. In addition, similar systems and devices are being used in commercial vehicles like buses, taxis and trains. However, it appears that these systems will also be common in private vehicles in a near future, and possibly also mandatory in at least some countries and regions.

The up to the present day most common approach for vehicle mounted breath testing equipment is to use a mouthpiece to which, after a deep breath, the user should empty his or her airways. This approach is referred to as active detection. To ensure a correct determination the user should deliver a forced expiration at almost full vital capacity. This requires substantial time and effort, especially for persons with limited capacity. In addition the mouthpiece, or part of the mouthpiece, is often a disposable plastic item for hygienic reasons. This results in cumbersome handling and the use of vast amounts of disposable plastic items, which would be the case if alcolocks become mandatory, is questionable from an environmental viewpoint.

An alternative approach is referred to as contactless detection wherein no mouthpiece is utilized and the breath testing apparatus typically receives a mixture of the exhaled breath and the surrounding air and a detection of an intoxicating substance is determined from a breath sample taken during the expiration at normal breathing. The detection may be truly passive wherein no action is required of the user, for example taking place while a user performs the regular starting up routine of a vehicle. Alternatively, the user may be instructed to perform certain actions that are meant to facilitate the detection process, for example the user may be instructed to breath towards an air inlet or the like. The challenge with contactless detection, even if user is instructed to breath in a certain direction or the like, is the low concentration of the substances to be detected and analyzed. An established method is to utilize tracer gases, typically carbon dioxide or water vapor, which are always present in the breath in highly predictable amounts, to both trigger the analysis of the target substance and to facilitate the determination of the target substance concentration value. However, it has proven difficult to get the contactless detection to function in a satisfactory manner in real life scenarios. Even if data indicating the presence or absence of an intoxicating substance, will eventually be correctly analyzed, the time needed for such classification is too long to be acceptable in a vehicle wherein the alcolock holds up the vehicle until approval is given, for example. Hence systems and methods that provides quicker and more reliable feedback to the user/driver is needed measurement errors must be handled in an effective manner.

U.S. Pat. No. 7,736,903 discloses a system and a method for passive detection of alcohol using a first and second tracer, and a first and second time period for compensating for environmental variations. The response time for such systems is typically minutes which is considered far too slow for practical use, both in automotive and other applications.

U.S. Pat. No. 8,377,705 discloses adding another tracer, water vapor, and another detection mode, in which the ethanol and tracer signals are measured at a first and a second time distinct from the first time. There is, however, no mention of how to avoid or manage measurement errors and the response time appears to be an issue also in this system/method.

SUMMARY OF THE INVENTION

The object of the invention is to provide a breath analyzing system and method of operation that overcomes the drawbacks of prior art passive detection systems.

This is achieved by the method as defined in claim 1, and the breath analysis system as defined in claim 17.

According to one aspect of the invention a method is provided. The method according to invention for determining a concentration of an intoxicating substance in the exhaled breath of a user and the method classifies the determined concentration as acceptable if the determined concentration is below a predetermined concentration limit, L, for example but not limited to a legal limit for the intoxicating substance, for example ethyl alcohol (ethanol). The method comprises the main steps of:

sampling repetitively a sensor signal representing the instantaneous concentration of the intoxicating substance and a sensor signal representing the instantaneous concentration of a tracer substance;

analyzing the tracer substance signal samples; and
if a peak in the tracer substance signal is detected, define an evaluation period relating to the duration of the tracer substance peak and not exceeding the duration of the tracer substance peak;
calculating, using the tracer signal samples and the intoxicating substance signal samples sampled during the evaluation period, a running average of the breath concentration of the intoxicating substance and an estimate of the associated statistical spread of the running average, and
classifying the concentration of the intoxicating substance using the average of the breath concentration of the intoxicating substance and the statistical spread and comparing with the predetermined concentration limit.

According to one embodiment the method comprises the further step, to be taken during the evaluation period, of:
if the estimate of the associated statistical spread indicates that the comparison can not be performed with a predetermined level of accuracy within the evaluation period, return to the sampling step to await a further peak in the tracer substance signal detection having an associated further evaluation period, and during which further evaluation period, the calculation of the running average of the breath concentration of the intoxicating substance and the associated statistical spread includes the tracer signal samples and the intoxicating substance signal samples associated with the present evaluation period and with at least the previous evaluation period. Alternatively the tracer signal samples and the intoxicating substance signal samples associated with a plurality, or all, previous evaluation periods are utilized in the calculations.

According to one embodiment of the method the step of analyzing the tracer substance signal samples evaluation period comprises:
analyzing a running set of the tracer substance signal samples and if an increasing slope is detected, the increasing slope indicative of a possible peak in the tracer substance signal, initiate an evaluation period; and
wherein, in the calculating step, the classification is performed only if the analysis of the running set of the tracer substance signal samples shows that the increasing slope was followed by a subsequent decreasing slope indicative of a peak in the tracer substance signal during the evaluation period.

According to one embodiment of the method if no decreasing slope could be detected in the running set of the tracer substance signal samples within a predetermined time period, the running average of the breath concentration of the intoxicating substance and the associated statistical spread are discarded and the process returns to the sampling step to await a further increasing slope.

According to one embodiment of the method the evaluation period comprises the steps of:
calculating a running average breath concentration, $S_{Br-av}$, of said intoxicating substance signal for the increasing number of intoxicating substance signal samples of the evaluation period, the breath concentration calculation based on the relative magnitude between the intoxicating substance signal and the tracer substance signal and calculating a statistical variance, $S_{Br-\sigma}$, of the breath concentration as the estimate of the associated statistical spread;
calculating a gap value, G, indicating if a reliable classification can be performed, the gap value being a function of at least the current calculated running average breath concentration $S_{Br-av}$, and the statistical variance, $S_{Br-\sigma}$, as a measure of the associated statistical spread, and
repeating the steps of calculating for increasing number of sensor signal samples until the gap value indicates that a reliable classification can be performed, and
performing the classification by comparing the running average breath concentration with the predetermined concentration limit, L, and
analyzing the slope of the tracer signal samples, and
if a decreasing slope in consecutive tracer signal samples is detected within the evaluation period the existence of a peak is determined as verified and the classification is determined to be correct and the classification result is outputted and the classification process is ended, and
if no decreasing slope in consecutive tracer signal samples is detected within the evaluation period, the evaluation period is ended, the calculated running average breath concentration, $S_{Br-av}$, the statistical variance of the breath concentration, $S_{Br-\sigma}$, the gap value, G and the classification are discarded and the method returns to the steps of sampling the sensor signals and analyzing the tracer substance signal samples.

According to one embodiment of the method the step of step of calculating further comprises the step of:
calculating a running total measurement error estimate, $E_{est}$, the running total measurement error estimate being a function of at least the standard deviation of the breath concentration, a predetermined multiplicative error component, $E_{mult}$, multiplied with the average breath concentration and a predetermined additive error component, $E_{add}$; and wherein the gap value, G, is a function of at least the predetermined concentration limit, the running average breath concentration and the running total measurement error estimate.

The gap value, or a representation of it, is preferably presented to the user. According to one embodiment a rate of change of the gap value is calculated which is used to estimate the remaining time to perform a reliable classification. Such estimate may also be presented to the user According to embodiments of the method the step of analyzing the tracer substance signal to detect a peak comprises calculating and analyzing the first and/or second time derivate of the tracer signal. A peak onset time corresponds to a first zero crossing in the second derivative and a peak decline time corresponds to a consecutive zero crossing in the second derivative of the tracer signal.

According to one embodiment of the method the evaluation period is terminated after a time corresponding to a predetermined average exhalation time period of a human respiratory cycle.

According to one embodiment of the method the running average breath concentration over m time samples, $S_{Br-av}$, is calculated according to $$S_{Br-av}(m) = \Sigma_m S_{Br-i}/m,$$

and the associated statistical spread, $S_{Br-\sigma}$, is the standard deviation calculated according to $$S_{Br-\sigma}(m) = \sqrt{\left(\frac{1}{m-1}\right)\Sigma_m (S_{Br-i} - S_{Br-av})^2},$$

wherein, m, is the number of time samples and the total measurement error estimate is calculated according to $$E_{est}=M*S_{Br-\sigma}(m)+E_{add}+E_{mult}*S_{Br-av}$$

wherein M is a predetermined multiple of the standard deviation, $S_{Br-\sigma}$.

According to one embodiment of the method the gap value, G, is calculated according to $$G=\pm(L-S_{Br-av})+E_{est}$$

wherein the addition of $(L-S_{Br-av})$ and $E_{est}$ is used when $S_{Br-av}$ is greater than L, and the difference of $(L-S_{Br-av})$ and $E_{est}$ is used when $S_{Br-av}$ is smaller than L, and the classification is determined as reliable when the condition G<0 is fulfilled.

According to one embodiment of the method if no peak is detected in the tracer signal during a first predetermined time period a warning of missing data is issued.

According to one embodiment of the method if no peak could be verified in the tracer signal during a second predetermined time period a warning or an instruction is issued to direct the user to take action.

The breath analysis system according to the invention for determining a concentration of an intoxicating substance in the exhaled breath of a user comprises a measuring unit in connection to and under control of an control unit, which is in connection with a human/machine interface unit, the measuring unit is provided with an inlet which is arranged to direct a breath sample from a user into a measurement cell of the measuring unit, the inlet provided in a position that during use is in front of the user, the breath analysis system. The control unit is arranged to:
  controlling the measuring unit to sample repetitively a sensor signal representing the instantaneous concentration of the intoxicating substance and a sensor signal representing the instantaneous concentration of a tracer substance;
  determining if a peak in the tracer substance signal is detected, and if a peak is detected, define an evaluation period relating to the duration of the tracer substance peak and not exceeding the duration of the tracer substance peak;
  calculating, using the tracer signal samples and the intoxicating substance signal samples sampled from the measuring unit during the evaluation period, a running average of the breath concentration of the intoxicating substance and an estimate of the associated statistical spread of the running average;
  classifying the concentration of the intoxicating substance using the average of the breath concentration of the intoxicating substance and the statistical spread and comparing with the predetermined concentration limit; and
  forwarding the classification result to the human/machine interface unit, which is arranged to output a representation of the classification result to a user.

According to one embodiment the control unit of the breath analysis system is further arranged to
  if the estimate of the associated statistical spread indicates that the comparison can not be performed with a predetermined level of accuracy within the evaluation period, store the calculated running average of the breath concentration of the intoxicating substance and the estimate of the associated statistical spread in a memory device, and
  control the measuring unit to continue sampling to await a further peak in the tracer substance signal detection having an associated further evaluation period, and during which further evaluation period, the calculation of the running average of the breath concentration of the intoxicating substance and the associated statistical spread includes the tracer signal samples and the intoxicating substance signal samples associated with the present evaluation period and with at least the previous evaluation period.

According to one embodiment the control unit is further arranged to in the calculation of the running average of the breath concentration of the intoxicating substance and the associated statistical spread include the tracer signal samples and the intoxicating substance signal samples associated with the present evaluation period and all previous evaluation periods.

According to one embodiment the control unit is further arranged to in the step of analyzing the tracer substance signal samples evaluation period:
  analyze a running set of the tracer substance signal samples and if an increasing slope is detected, the increasing slope indicative of a possible peak in the tracer substance signal, initiate an evaluation period; and
  wherein, in the calculating step, the classification is performed only if the analysis of the running set of the tracer substance signal samples shows that the increasing slope was followed by a subsequent decreasing slope indicative of a peak in the tracer substance signal during the evaluation period.

According to one embodiment breath analysis system further comprises a vehicle drivability control unit in connection with the control unit, and wherein the control unit is arranged to, if the classification result is that concentration of the intoxicating substance user is not acceptable, instruct the vehicle drivability control unit to not allow the user to drive the vehicle.

Thanks to the invention it is possible to provide a breath analysis method and system with substantially improved measurement error handling which significantly reduces the time to a reliable classification.

One advantage afforded by the present invention is that the gap to classification approval is being communicated to the user during the measurement/analyzing, until the measurement error is sufficiently reduced to be either below or above a preset limit value, i.e. until a correct classification has been reached. By providing this feedback to the user a higher degree of acceptance for the measurement/analyzing time period is to be expected.

Another advantage is that the system starts collecting data immediately upon power-up, and classification occurs in real time based on available data. Thereby, startup time is immediate without need for steady-state conditions to become established.

One further advantage is that the classification will only be performed when sufficient accuracy has been obtained, thus minimizing the risk for false classification results.

In the following, the invention will be described in more detail, by way of example only, with regard to non-limiting embodiments thereof, reference being made to the accompanying drawings.

BRIEF DESCRIPTION OF THE DRAWINGS

FIGS. 3a-d are schematic graphs showing tracer concentration T (a), substance concentration S (b), accumulated calculated breath substance concentrations $S_{Br-av}$ (c) and classification C as functions of time for a subject not having a substantial breath substance concentration;

FIGS. 4a-d are schematic graphs showing tracer concentration T (a), substance concentration S (b), accumulated calculated breath substance concentrations $S_{Br-av}$ (c) and classification C as functions of time for a subject having a substantial breath substance concentration, the concentration being below the limit L;

FIGS. 5a-d are schematic graphs showing tracer concentration (a), the first time derivative (b), second time derivative (c) and dilution factor (d) as functions of time;

FIGS. 7a-d are schematic graphs showing the correlation between the tracer T and the substance S signals at different situations, wherein (a) illustrates an undisturbed situation involving distinct and coinciding peaks, (b) illustrates the occurrence of a static offset error occurring in the T signal, (c) illustrates an offset drift in time occurring in both the T and S signals and (d) illustrates a low S signal level.

DETAILED DESCRIPTION

Figure 1:
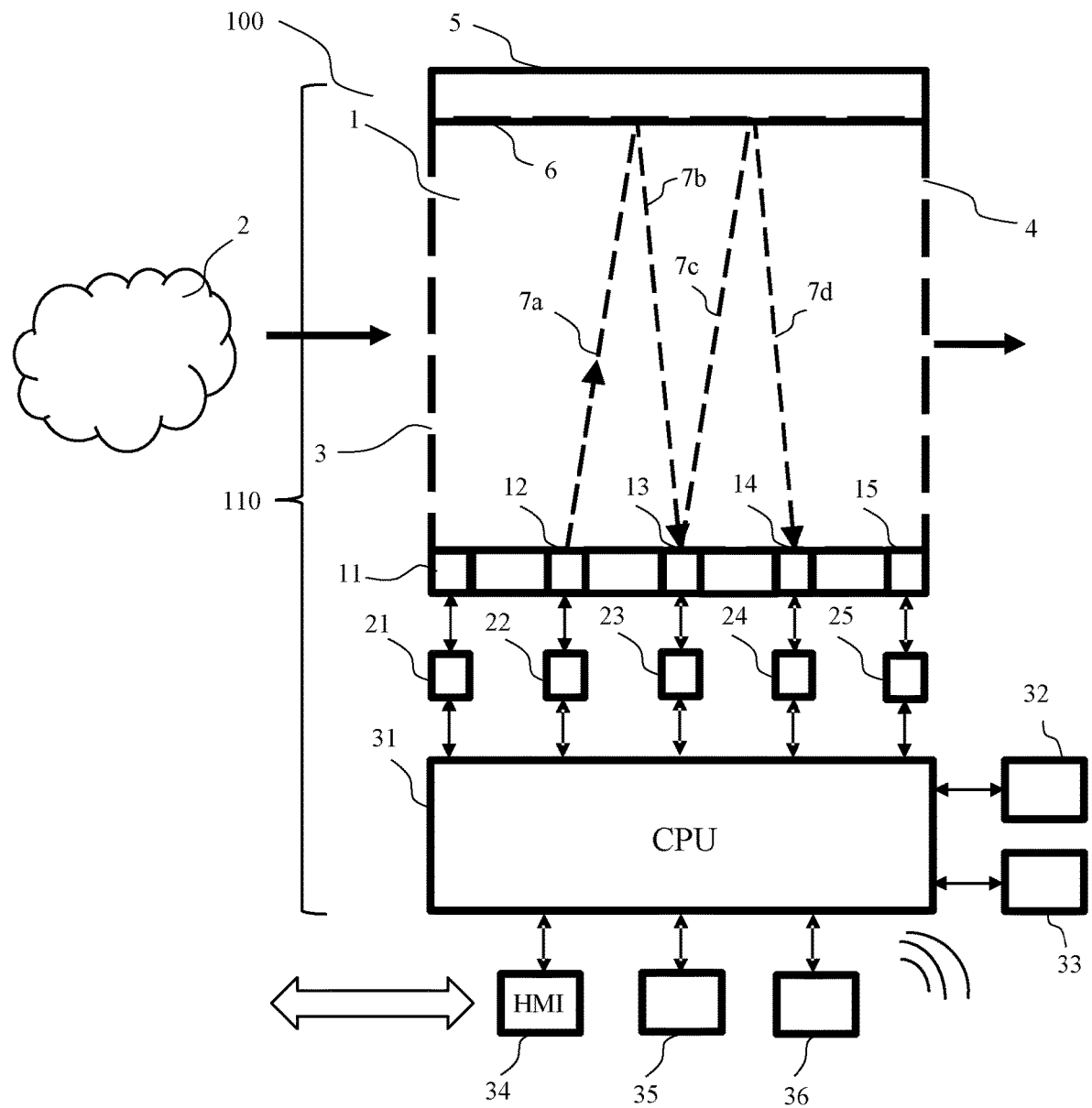
FIG. 1 is a schematic illustration of a breath analysis apparatus according to the present invention.

Terms such as "top", "bottom", upper", lower", "below", "above" etc are used merely with reference to the geometry of the embodiment of the invention shown in the drawings and/or during normal operation of the device/devices and are not intended to limit the invention in any manner.

Definitions

By classification in the present context is meant judging whether a subject's breath concentration of an intoxicating substance, e g ethyl alcohol, is above or below (at or below) a predefined limit value.

A tracer is a physiological substance inherently associated with expired breath, e g carbon dioxide or water vapor.

By baseline is meant a signal level corresponding to the concentration of intoxicating substance or tracer to which other instantaneous signal values are referred. An offset error is a deviation from the baseline.

A concentration peak is defined by a maximum in a measured concentration versus time with increasing concentration before the peak maximum and declining thereafter.

The breath analysis system and the method according to the invention will primarily be described as a contactless detection system mounted in a vehicle, which represents an important implementation of the invention. As realized by the skilled person, the teachings are equally relevant for stand alone systems, for example systems at an entrance to a work area, fleet depot or the like.

FIG. 1 is a schematic drawing of the breath analysis system 100 according to the invention. The breath analyzer 1 comprises a measuring unit 110 comprising a measuring cell or cavity into which a breath sample 2 is drawn for analyzing its content of tracer and intoxicating substances. The inlet 3 of the measuring cell 1 includes a heater of the air sample to avoid condensation of the inner walls 6 of the cavity 1, which may include an enclosure for housing a number of devices integrated with the breath analyzer 1. The outlet 4 of the chamber 1 includes a fan for driving the air flow through the chamber.

The sensor signals according to one embodiment of the invention are generated by non-dispersive infrared (NDIR) spectroscopy, in which a beam 7a-d of infrared radiation is emitted by an IR source 12 inside the cavity 1. The IR beam 7a-d is reflected several times at the inner wall 6 of the cavity 1, and will hit separate detectors 13, and 14 tuned to the absorption spectra of the tracer and intoxicating substances, respectively. $CO_2$ has a strong absorption peak at a wavelength of 4.26 µm, whereas $H_2O$ has relatively broad peaks at 2.5-2.8 and 5.3-7.6 µm. Ethyl alcohol has a specific peak at 9.5 µm not shared by any of the most frequent interfering substances, but with a small cross sensitivity to $CO_2$.

Other detection principles may be utilized, for example electrochemical sensors utilizing catalytic combustion of the intoxicating substance, represent alternative embodiments.

The IR source 12 and detectors 13, 14 are preferably operating synchronously, using a repetition and sampling rate exceeding the frequency bandwidth required for the analysis of breath signals. Synchronous operation using phase-locking techniques is preferable from the point of view of noise and interference suppression. A repetition and sampling rate of 5 Hz may be considered as a lower limit which is compatible with the response time of MEMS-based (Micro Electro-Mechanical Systems) IR emitters, and photovoltaic or thermopile IR detectors.

At the inlet 3 of the cavity 1, the air flow is heated to avoid water condensation at the mirror surfaces. A heater control circuit 11 is connected to the inlet 3 using temperature sensors to generate a feedback signal. The air flow through the breath analyzer cavity 1 is driven by a fan at the outlet 4 and controlled by a flow control unit 15 including tachometer sensing of the air flow velocity.

Interface electronic circuitry 21, 22, 23, 24, 25 is controlling the preheater 11, IR source 12, tracer detector 13, substance detector 14, and flow control unit 15, respectively. Each of these subsystems include electronic drive and power supply control devices adapting the different functionalities to be manageable by a central processing unit, CPU, 31 which is a general-purpose digital microcontroller. Also included in the breath analysis system 100 are memory devices 32, 33 for permanent and temporary storage of information.

The CPU 31 and the memory devices 32 and 33 are arranged to control the transfer and storage of data including sensor signals during the analysis described below, and to control the method steps and in real time execute the mathematical operations described below. As appreciated by the skilled person other configurations are possible to provide the controlling and computational functions here indicated and the above described should be regarded as an illustrative example and one embodiment. One alternative embodiment is that the breath analysis system is integrated with other measurement and/or controlling systems in a vehicle and the functions of the CPU 31 is provided by a main CPU in the vehicle also handling other tasks and the detectors 13, 14 and the other units of the breath analysis system 100 communicates via a vehicle bus system or similar.

The breath analysis system 100 comprises a human/machine interface (HMI) unit 34 for audiovisual communication between the system and the subject. The HMI unit 34 typically comprises communication means via microphone/loudspeaker, touch screen or other input/output devices. It has the capability of visual, verbal or symbolic communication of specific requests and classification results to the subject. Alternatively, the breath analysis system 100 is connected to and utilizes an existing infotainment system in the vehicle for the human/machine interface.

In automotive applications the system may include a vehicle drivability control unit 35 directly connected to the vehicle control system, providing the "alcolock" functionality. In vehicles driven by fossil fuel, the unit 35 may control the ignition, and in other types of vehicles it will control other basic driving mechanisms.

A communication unit 36 for wireless information exchange between the breath analysis system 100 and other external units, preferably over the internet, may be provided and is useful in a wide range of applications, in which data concerning the sobriety status of a moving subject may be conserved or updated regardless of physical presence at a certain location. Alternatively, the vehicles external communication means, if such are provided, is utilized.

The method according to the invention of determining and classifying if a concentration of a specified intoxicating substance in the exhaled breath of a subject is acceptable i.e. at or below a predefined concentration limit, is illustrated in the flowcharts of FIG. 5a-b. The method is performed during breath analysis of a human breath sample using the breath analysis system 100 according to the invention and the output is a classification based on if a determined concentration of specified intoxicating substance in the exhaled breath of the user is above (not accepted) or below (accepted) a predetermined concentration limit, L. The classification may initiate further steps, for example, is the classification is "not accepted" then the alcolock function is initiated.

Figure 2A:
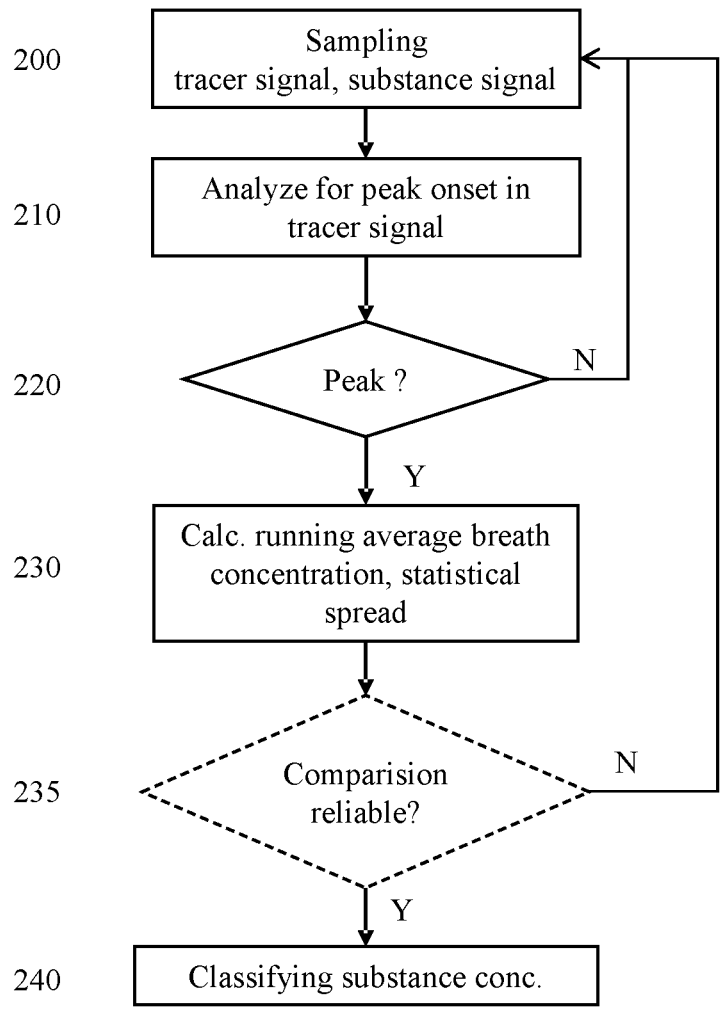
FIGS. 2a and b are flowcharts of embodiments of the method according to the present invention.

The method comprises the main steps, illustrated in the flowchart of FIG. 2a, of:
- 200 sampling repetitively a sensor signal representing the instantaneous concentration of the intoxicating substance and a sensor signal representing the instantaneous concentration of a tracer substance;
- 210 analyzing the tracer substance signal samples; and
- 220 if a peak in the tracer substance signal is detected, define an evaluation period relating to the duration of the tracer substance peak and not exceeding the duration of the tracer substance peak;
- 230 calculating, using the tracer signal samples and the intoxicating substance signal samples sampled during the evaluation period, a running average of the breath concentration of the intoxicating substance and an estimate of the associated statistical spread of the running average, and
- 240 classifying the concentration of the intoxicating substance using the average of the breath concentration of the intoxicating substance and the statistical spread and comparing with the predetermined concentration limit.

The method and the breath analyzing system may be seen being in a monitoring mode wherein sensor signals are sampled and the tracer signal samples are analyzed after an indication or onset of a possible peak in the tracer substance signal. If an onset of a possible peak is detected the method and systems enters into an evaluation period immediately after the detection of the onset of a possible peak, without yet having verified that the onset relates to an actual peak in the tracer substance signal that can be assumed to be associated with an exhalation of the user/driver. By starting the process of analyzing the concentration of specified intoxicating substance already at the onset of a possible peak facilitates a real time measurement and classification and shortens the time period before a reliable classification may be performed and presented to the user.

According to one embodiment the verification of an actual peak is performed continuously but after calculations of the running average of the breath concentration and the statistical spread has been initiated. If no verification can be made the method/system returns to the monitoring mode to wait for a next peak onset. Alternatively, and according to one embodiment of the invention, the sensor signals are sampled for the complete evaluation period and stored in for example the temporary memory device 33, and the calculation of the running average of the breath concentration and the statistical spread are performed after a verification of that a peak in the tracer signal has occurred. For the user this will still be perceived as a real time measurement and presentation of the classification result, as the duration of single evaluation period is short, typically a few seconds.

The classification result, exemplified with concentration classified as "acceptable" or "not acceptable" or a representation of the classification result is presented, for example displayed, to the user. In addition the classification result is communicated to other units in the breath analyzing system, other units in the vehicle or externally. According to one embodiment a classification being "not acceptable" initiate an alcolock function by the vehicle drivability control unit 35 or a similar functionality provided in the vehicle. Presenting the representation of the classification may be complemented with displaying also the determined concentration of the intoxicating substance. The determined concentration of the intoxicating substance may further be communicated to other entities, for example an external database, for gathering statistics and further analysis.

The sampling continues at the predetermined rate during both the monitoring mode and the breath analyzing mode. According to one embodiment a plurality of predetermined sampling rates are used, wherein for example one sample rate, a faster sampling rate is used during the evaluation period(s) and a slower sampling rate is used in between evaluation periods. In that embodiment, the detection of possible peak in the tracer signal initiate a change of sampling rate. The skilled person would also recognize that a small jitter may be present in the actual sampling rate due to conditions in the measuring cell unit 110, for example.

According to one embodiment, the method comprises the further step, to be taken during the evaluation period, of:
- (235) if the estimate of the associated statistical spread indicates that the comparison can not be performed with a predetermined level of accuracy within the evaluation period, return to the sampling step to await a further peak in the tracer substance signal detection having an associated further evaluation period, and during which further evaluation period, the calculation of the running average of the breath concentration of the intoxicating substance and the associated statistical spread includes the tracer signal samples and the intoxicating substance signal samples associated with the present evaluation period and with at least the previous evaluation period. According to one embodiment the calculation of the running average of the breath concentration of the intoxicating substance and the associated statistical spread includes the tracer signal samples and the intoxicating substance signal samples associated with the present evaluation period and all previous evaluation periods.

According to one embodiment analyzing the tracer substance signal to detect a peak comprises calculating and analyzing the first and/or second time derivate of the tracer signal. If the first derivate is used inflection points are identified and if the second derivate is used zero crossings are identified and used to determine the duration of the peak and hence the evaluation period.

The detection of the peak in the tracer signal may also incorporate other conditions to be met before a possible peak is verified as corresponding to an exhalation of the user. Such condition may include a minimum duration of the peak, the amplitude of the peak being larger than a predetermined threshold value and also more elaborate analysis including the shape of the curve. In certain cases, for example if there is an increasing background signal (see for example FIG. 7c) the decline of the peak may be hidden and it may be appropriate to consider using an inflection point or removing the background signal, if possible.

According to one embodiment the evaluation period is terminated after a predetermined time corresponding to, or slightly longer, than an average exhalation time period of a human respiratory cycle, even if the existence of the peak in the tracer signal could not be detected.

According to one embodiment, if no peak is detected in the tracer signal during a first predetermined time period a warning of "missing data" is issued.

Figure 2B:
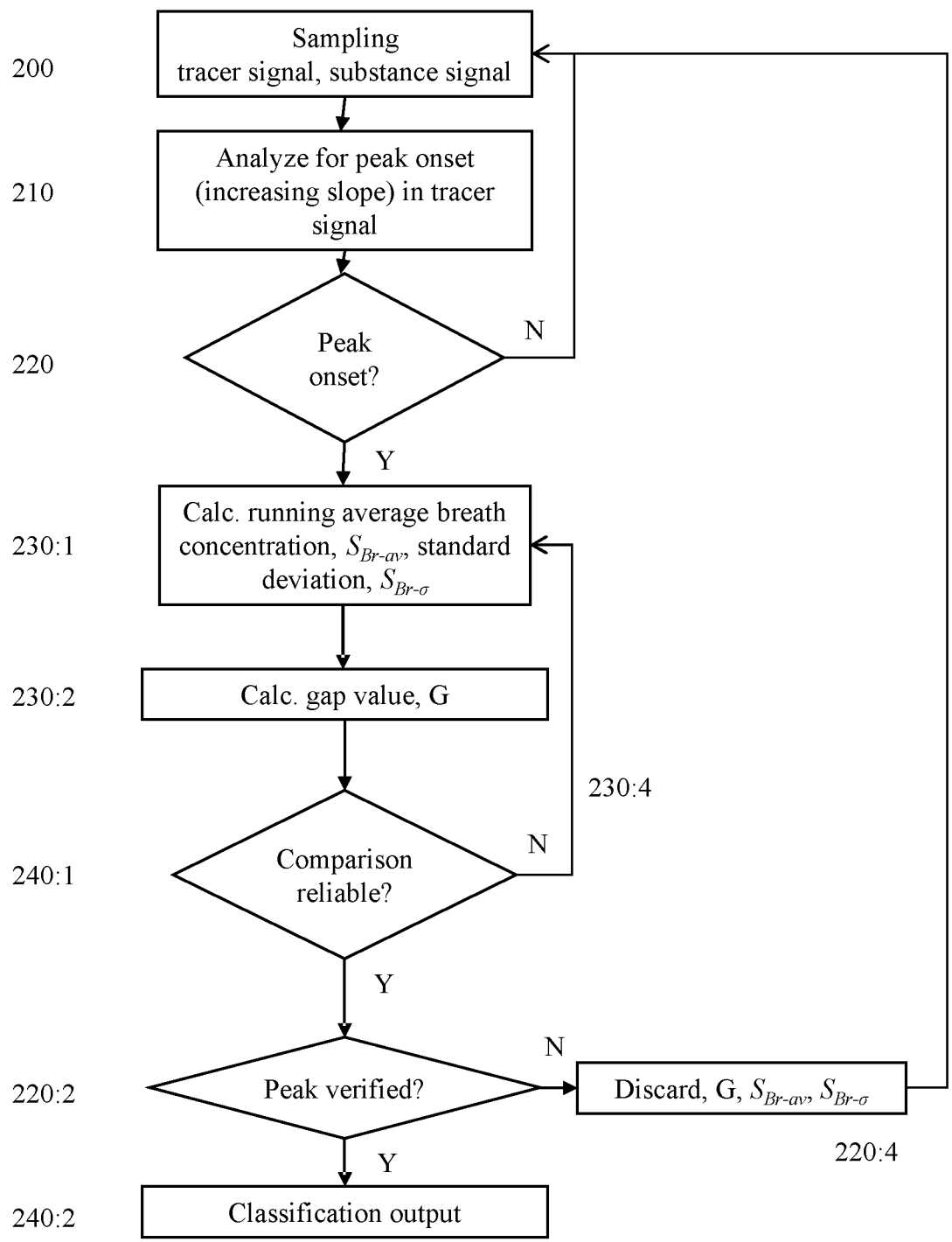

According to one embodiment of the invention, illustrated in the flowchart of FIG. 2b, the method comprises a monitoring mode comprising the steps of:
- 200: sampling a sensor signal representing the instantaneous concentration of the intoxicating substance and a sensor signal representing the instantaneous concentration of a tracer substance and repeating the samplings at a predetermined sampling rate;
- 210: analyzing a running set of the tracer substance signal samples and if an increasing slope is detected, the increasing slope indicative of a possible peak in the tracer substance signal, initiate an evaluation period;
  - 230:1 calculating a running average breath concentration, $S_{Br-av}$, of said intoxicating substance signal for the increasing number of intoxicating substance signal samples of the evaluation period, the breath concentration calculation based on the relative magnitude between the intoxicating substance signal and the tracer substance signal and calculating a statistical variance, $S_{Br-\sigma}$, of the breath concentration as the estimate of the associated statistical spread;
  - 230:3 calculating a gap value, G, indicating if a reliable classification can be performed, the gap value being a function of at least the current calculated running average breath concentration $S_{Br-av}$, and the statistical variance, $S_{Br-\sigma}$, and
  - 230:4 repeating the steps of calculating for increasing number of sensor signal samples until the gap value indicates that a reliable classification can be performed, and
    - 240:1 performing the classification by comparing the running average breath concentration with the predetermined concentration limit, L, and
    - 220:2 analyzing the slope of the tracer signal samples, and
      - 220:3 if a decreasing slope in consecutive tracer signal samples is detected within the evaluation period the existence of a peak is determines as verified and the classification is determined to be correct and the classification result is outputted 240:2 and the classification process is ended, and
      - 220:4 if no decreasing slope in consecutive tracer signal samples is detected within the evaluation period, the evaluation period is ended, the calculated running average breath concentration, $S_{Br-av}$, the statistical variance of the breath concentration, $S_{Br-\sigma}$, the gap value, G and the classification are discarded and the method returns to the steps of sampling the sensor signals and analyzing the tracer substance signal samples.

According to one embodiment the method comprises in the step 220:2 of calculating the gap value, G, of displaying a representation of the gap value. Preferably via the human/machine interface (HMI) unit 34. In one embodiment the rate of change of the gap value is calculated and used to estimate the remaining time to perform a reliable classification and a representation of the estimate is displayed as a complement or instead of the representation of the gap value.

According to one embodiment a running total measurement error estimate, $E_{est}$, is calculated during the evaluation period according to equation 6 (see below). Hence, the running total measurement error estimate being a function of at least the standard deviation of the breath concentration, a predetermined multiplicative error component, $E_{mult}$, multiplied with the average breath concentration and a predetermined additive error component, $E_{add}$. The gap value, G, according to equation 7 (see below) is a function of at least the predetermined concentration limit, the running average breath concentration and the running total measurement error estimate.

Below are the details, representing different embodiments of the invention described and exemplified with references to the schematic illustrations of FIGS. 3 to 8.

FIGS. 3a-b show typical tracer T (a) and substance S (b) concentration readings versus time by a sensor located 20 to 50 cm in front of a sober subject's face. In a typical setting, the subject is a vehicle driver occupying the driver's seat, with the sensor being located at the steering wheel. At some point in time, $t_1$, the tracer signal is increasing from steady state as a result of exhaled breath from the subject arriving at the sensor. The onset time $t_1$ indicates the start of an evaluation period corresponding to the duration of an exhaled breath, or approximately five seconds. The onset time $t_1$ of the evaluation period may be determined by using preset criteria based on increasing slope and curvature of the tracer concentration as a function of time. The slope and curvature of the signal representing concentration may be determined by computing the first and second time derivative of the signal.

The tracer concentration $T_1$ occurring at $t_1$, the coordinate $t_1; T_1$, is preferably used as baseline for subsequent calculations of the T concentration. An alternative definition of the baseline is the smallest detected concentration within the current evaluation period. A third option is the average lowest concentration before and after a peak. These alternatives are preferably all implemented, and calculations using somewhat different baselines performed in parallel. In the error analysis, deviations between the computational alternatives are quantified. See further discussion related to offset error analysis.

From $t_1$ the slope of the tracer curve is steadily increasing until it reaches an inflection point at a time $t_2$ exhibiting a maximum of its first time derivative and a zero crossing of its second time derivative. The tracer concentration reaches a peak at a time $t_3$ corresponding to its time derivative being zero. During the decline of the tracer concentration, another inflexion point occurs at $t_4$ before the time $t_5$ when it reaches the same concentration as occurred at $t_1$. By repeated sampling of the sensor signals S and T, during the time interval $t_1$ to $t_5$, which is typically less than half a respiratory cycle, detailed analysis of the signal behavior can be performed.

The signals T and S are according to one embodiment sampled at a repetition rate of 5 samples per second or more using state of the art analog to digital converters. First and second time derivatives may be numerically computed in real time by recording first and second differences between subsequent signal samples.

The signal illustrated in FIG. 3b corresponds to the local concentration of the intoxicating substance S exhibits characteristics of random noise throughout the recording in the absence of this substance in the driver's breath. Readings of the substance concentration S at the times $t_1$, $t_2$, $t_3$, $t_4$, $t_5$ referred to a baseline as previously described will be close to zero except for random fluctuations due to noise. The coincidence in time and shape of concentration peaks in the T and S channels may all be determined from analysis of the time curves and their first and second derivatives. By shape is meant, for example, asymmetry between the rising and declining phases, or the peak widths defined by, for example, the time difference between inflection points.

The differences $\Delta T_i = T_i - T_1$ and $\Delta S_i = S_i - S_1$ for i=2, 3, 4, 5 at the times $t_2$, $t_3$, $t_4$, and $t_5$, or any sampling point $t_i$ in time, are used for calculation of the instantaneous breath concentration $S_{Br-i}$ of the intoxicating substance at time $t_i$. According to the equation (1) below, where the index i represents a time sample at $t=t_i$.

$$S_{Br-i} = \frac{T_{alv} * \Delta S_i}{\Delta T_i} = DF * \Delta S_i \quad (1)$$

$T_{alv}$ represents the alveolar tracer concentration, which is 42 000 ppm in the case of $CO_2$ as the tracer gas, and 60 000 for $H_2O$. Further numerical values of variables and parameters are provided below in relation to describing the error management strategy using data from table 1. The proportionality factor $T_{alv}/\Delta T_i$ corresponds to the degree of dilution of the expired breath, referred to as dilution factor, DF.

For simplicity, equation (1) is written using one of the alternative definitions of baseline, the coordinates $t_1$; $T_1$ as previously described. By redefining $T_1$ and $S_1$ to denote the baseline in the general case, equation (1) is still valid.

From calculations of instantaneous concentrations, the average breath concentration $S_{Br-av}$ and its standard deviation $S_{Br-\sigma}$ of several calculations over m time samples can be calculated according to equations (2) and (3).

$$S_{Br-av}(m) = \sum_m S_{Br-i}/m \quad (2)$$

$$S_{Br-\sigma}(m) = \sqrt{\left(\frac{1}{m-1}\sum_m (S_{Br-i} - S_{Br-av})^2\right)} \quad (3)$$

The third graph from the top of FIG. 3 shows the accumulated calculated breath substance concentrations $SB_{r-av}$ over time. The 'x' at each of the times $t_2$, $t_3$, $t_4$, is are the calculated average concentrations accumulated from the first instantaneous value at $t=t_2$. Starting from a significant value $S_{Br-2}$ at $t_2$, the subsequent calculated $S_{Br-av}$ at $t=t_3$ is closer to zero, reflecting the fact that the corresponding $T_3$ value is higher than $T_2$, resulting in a more accurate estimate of the actual zero substance concentration. In the method according to the invention the running average breath concentration, $S_{Br-av}$.

Each calculation of $S_{Br-av}$ is associated with an estimate of the total measurement error marked by the simultaneous 'o' in the third graph from top of FIG. 3 of the corresponding calculations. The error estimate includes both systematic and random errors, such as a multiple of the standard deviation expressed in equation (3). The error is decreasing with time as indicated in FIG. 3c, due to accumulating underlying data. Already at $t_3$ the estimated error is below a preset limit value L. Although the signal contributions slowly decrease during the decline of the tracer peak, there is some further reduction of the error at $t_4$. At $t_5$, however, there is no further error reduction.

When the estimated $S_{Br-av}$ including the error is below the preset level L occurring at $t_3$, the drivability D of the vehicle is raised to full access as shown in the bottom graph of FIG. 3d.

In embodiments of the method according to the invention the running average breath concentration, SBr-av, and the statistical variance, SBr-σ, are calculated according to equations (2) and (3), respectively with samples from a current evaluation period or from a plurality of evaluation periods.

FIGS. 4a-d have the same graphical outline as FIGS. 3a-d, but with a case when the subject is exhaling a non-zero intoxicating substance concentration. The two coinciding peaks shown in the tracer and substance concentrations are an effect of two expired breaths with a time interval of approximately 5 seconds. The instant $t_1$ occurs at the beginning of one breath, when the tracer concentration T is starting to increase. When the tracer peak is declining, and its difference value $T_i - T_1$, slope and curvature are used as indicator for stopping the calculations at a time $t_N$. New starting and stopping times are defined by the beginning and decline of the next peak as illustrated by the vertical dashed lines extending through the graphs of FIG. 4a-d.

The combination of statistical variability and systematic errors generates an accumulating error band with defined top and bottom values as depicted by the dashed curves surrounding individual $S_{Br-av}$ readings shown in the third graph, FIG. 4c. This graph also illustrates that the accumulated $S_{Br-av}$ values and error bands are ambiguously crossing the concentration limit L after the first breath. In this case data from a second breath need to be accumulated and analyzed before the location of the error band below the limit L can be established.

A significant occasion is the time when in the graph of FIG. 4c the upper end of the error band crosses the preset limit concentration L. At this point in time, there is evidence of the driver's true breath substance concentration being lower than the preset limit L. Correspondingly, if $S_{Br-av}$ and the error band would point at a value above L, the occurrence of classification evidence would correspond to the crossing between the bottom value of the error band and the line $S_{Br}=L$.

FIG. 4d depicts the drivability control signal D as a function of time, using the same time scale as in the previous three graphs. At the time of crossing between the upper end of the $R_{av}$ error band the preset level L, full drivability should be warranted, whereas only limited drivability, or none at all, shall be allowed before this occurrence. The limitation could be a maximum velocity of 20 km/hour to make sure that no serious accidents due to drunk driving will occur. Depending on the driving mechanism of the vehicle, the drivability control unit should be adapted to its specific design and requirements.

FIGS. 5a-d illustrates schematically the signal characteristics representing a series of exhaled breaths from an unexperienced subject. To clarify the system analysis, the sensor representing the tracer concentration on the top graph, FIG. 5a is accompanied by its first, FIG. 5b and second time derivative FIG. 5c, dT/dt, and $D^2T/dt^2$, respectively.

The signal T in the graph of FIG. 5a shows a tight sequence of five concentration peaks $A_1$-$A_5$ resulting from consecutive exhaled breaths. The time interval between the peaks are too small for the baseline to be returning to its original level between each breath. The reason is that residual gas from the previous breath was still present within the breath analyzer cavity, adding to the tracer concentration. The shaded areas below four of the five peaks represent time intervals at which peak parameters are being calculated. The timings and baselines for each calculation are determined by features from the graphs of dT/dt, $d^2T/dt^2$, and DF, shown below the top graph. All graphs share the same time scale.

The starting and stopping points in time are determined by inflection points of the top curve, FIG. 5a, coinciding with zero crossings of $d^2T/dt^2$, FIG. 5c. The baseline in the exemplified embodiment is defined by the coordinates at which the dilution factor DF is below a preset limit $DF_{max}$. These coordinates are evident from the fourth graph from the top of FIG. 5. The fourth peak $A_4$ from left in FIG. 5d never reaches this level. According to one embodiment of the invention the calculation step is performed if the dilution factor is above a preset limit $DF_{max}$.

Table 1 is a summary of error sources of various origin, either systematic or stochastic, additive or multiplicative, and their approximate magnitude. The exemplified case concerns ethyl alcohol as the intoxicating substance with either $CO_2$ or $H_2O$, or both, as tracer substance. The error estimates are presented in relation to an assumed limit alcohol concentration of 50 ppm, which is the legal limit for vehicle drivers in Sweden. A maximum dilution factor DF=100 is assumed. For stochastic error contributions, the estimated magnitudes correspond to one standard deviation.

TABLE 1

Estimated magnitude of error sources related to physiology, environment and technology. The estimations are partly based on the following literature: A. B. Lumb Nunn's Applied Respiratory Physiology, 6$^{th}$ Ed. (2005), A. Kaisdotter Andersson Improved Breath Alcohol Analysis with Use of Carbon Dioxide as the Tracer Gas (2010), J. Ljungblad High Performance Breath Alcohol Analysis (2017).

| Error source description | Systematic/ stochastic | Additive/ multiplicative | Magnitude (%) |
|---|---|---|---|
| Alveolar tracer variability ($CO_2$) | Both | Mult | 10-15 |
| Alveolar tracer variability ($H_2O$) | Both | Mult | 3-5 |
| Physiological dead space | Both | Both | 3-5 |
| Background tracer variability ($CO_2$) | Both | Add | 1-3 |
| Background tracer variability ($H_2O$) | Both | Add | 0-100 |
| Gas flow inhomogeneities | Stoch | Both | 5 |
| Noise | Stoch | Both | 10 |
| Tracer offset | Syst | Mult | 5 |
| Substance offset | Syst | Add | 2 |
| Calibration, linearity | Syst | Mult | 5 |
| Cross sensitivity | Syst | Both | 2 |

The first three variabilities are related to physiology, the next three are environmental, whereas the remaining five sources are related to technological performance. The categorization in systematic or stochastic nature is important for the management strategy. A systematic error source can be considered as a constant parameter, whereas a stochastic error should preferably be dynamically retrieved. By observing the convergence of $S_{Br-av}$ during the measurement period, the reliability of the classification will be improved. The additive or multiplicative nature of an error will mainly influence its estimated magnitude.

The alveolar tracer variabilities of $CO_2$ and $H_2O$ are both inter-individual and related to the level of physical activity. Therefore, they include both systematic and stochastic elements depending on actual circumstances. As previously noted, the alveolar $CO_2$ concentration is approximately 42 000 ppm, and 60 000 ppm is the corresponding $H_2O$ concentration. The variabilities noted in Table 1 are one standard deviation from the average values. The influence from these variabilities are mainly multiplicative being part of the dilution factor DF. The physiological dead space is different for $CO_2$ compared to $H_2O$ since the origin of $CO_2$ is alveolar, whereas $H_2O$ is diffused from the entire respiratory tract.

The background $CO_2$ variability is 400-1000 ppm in absolute numbers which is relatively small in comparison with the alveolar concentration of 42 000 ppm. The background $H_2O$ variability is much larger, and its limits are depending on systematic or circumstantial environmental variabilities. In extreme circumstances, the background concentration may exceed the alveolar concentration of 60000 ppm.

It should be noted that the error properties of $CO_2$ and $H_2O$ as tracer substances are complimentary. The alveolar tracer variability of $H_2O$ is 3-5 times better than the corresponding $CO_2$ variability. On the other hand, the background variability of $CO_2$ is more than an order of magnitude smaller than the corresponding $H_2O$ value. Improved performance can therefore be expected when both these substances are used in combination.

Gas flow inhomogeneities may result from ambient air flow at the site of classification or from mixing effects due to the varying expiratory air flow. In the former case, the contribution will be additive, in the latter it will be multiplicative.

Noise appearing in the sensor signals can be further categorized into thermal, flicker, or shot noise, depending on the underlying physical principle. In NDIR systems, thermal noise from the infrared detectors will dominate. The magnitude of this noise source is proportional to the square root of the bandwidth. Time averaging of the signal output will thus increase the signal to noise ratio.

Offset errors may have different causes, ranging from alternative definitions of baseline deviation, to drift due to, for example, temperature, barometric pressure, and supply voltage. Offset occurring in the tracer signal will have multiplicative influence, whereas a substance offset error will be additive.

A static offset error $E_{off}$ on either the T or S sensor signals will manifest itself as a truncation of the offset peak. It can therefore be detected and managed within the time interval of a single breath by observing a difference in relative width $\Delta W/W$ of the peaks resulting in a difference in peak magnitude P following the relation $$\frac{\Delta W}{W} = -\frac{E_{off}}{P}. \qquad (4)$$

Calibration errors are multiplicative deviations from linear sensor signal characteristics. They may occur both in the signals corresponding to the intoxicating or tracer substances.

Cross sensitivity between the involved substances may result from overlap in the spectroscopic absorption curves. The influence is basically known from the spectroscopic data and may at least partly be considered as a systematic error source. In the general case it may be either additive or multiplicative.

Data from table 1 may be combined to allow estimation of the estimated total breath substance concentration $S_{Br\text{-}est}$ as the sum between the average value $S_{Br\text{-}av}$ and the estimated calculation error $E_{est}$ $$S_{Br\text{-}est} = S_{Br\text{-}av} \pm E_{est} \quad (5)$$

The equation (5) is written for the case of a symmetric error band. In the more general case, additive and subtractive contributions may be separated. In equation (6), the stochastic and systematic contributions to $E_{est}$ are summarized. According to embodiments of the invention the estimated total breath substance concentration $S_{Br\text{-}est}$ is calculated using equation (5).

$$E_{est} = M * S_{Br\text{-}\sigma}(m) + E_{add} + E_{mult} * S_{Br\text{-}av} \quad (6).$$

The stochastic error is a multiple M of the standard deviation as defined by equation (3). With M=3, the probability of a stochastic error exceeding this limit will be smaller than 0.5%, assuming a normal probability distribution.

$E_{add}$ represents the combined systematic and additive error sources as listed in Table 1. The corresponding multiplicative error $E_{mult}$ is multiplied with $S_{Br\text{-}av}$ to provide the actual error contribution. According to embodiments of the invention a running total measurement error estimate, $E_{est}$, is calculated using equation (6).

The classification of whether, or not, the breath substance concentration $S_{Br}$ exceeds a preset limit value L can only be performed when $S_{Br\text{-}est}$ including the error band according to equations (5) and (6) is below or above L. The gap G to classification follows from eq. (5) as illustrated in FIG. 6 and is expressed by the following equation:

$$G = \pm(L - S_{Br\text{-}av}) + E_{est} \quad (7).$$

Figure 6:
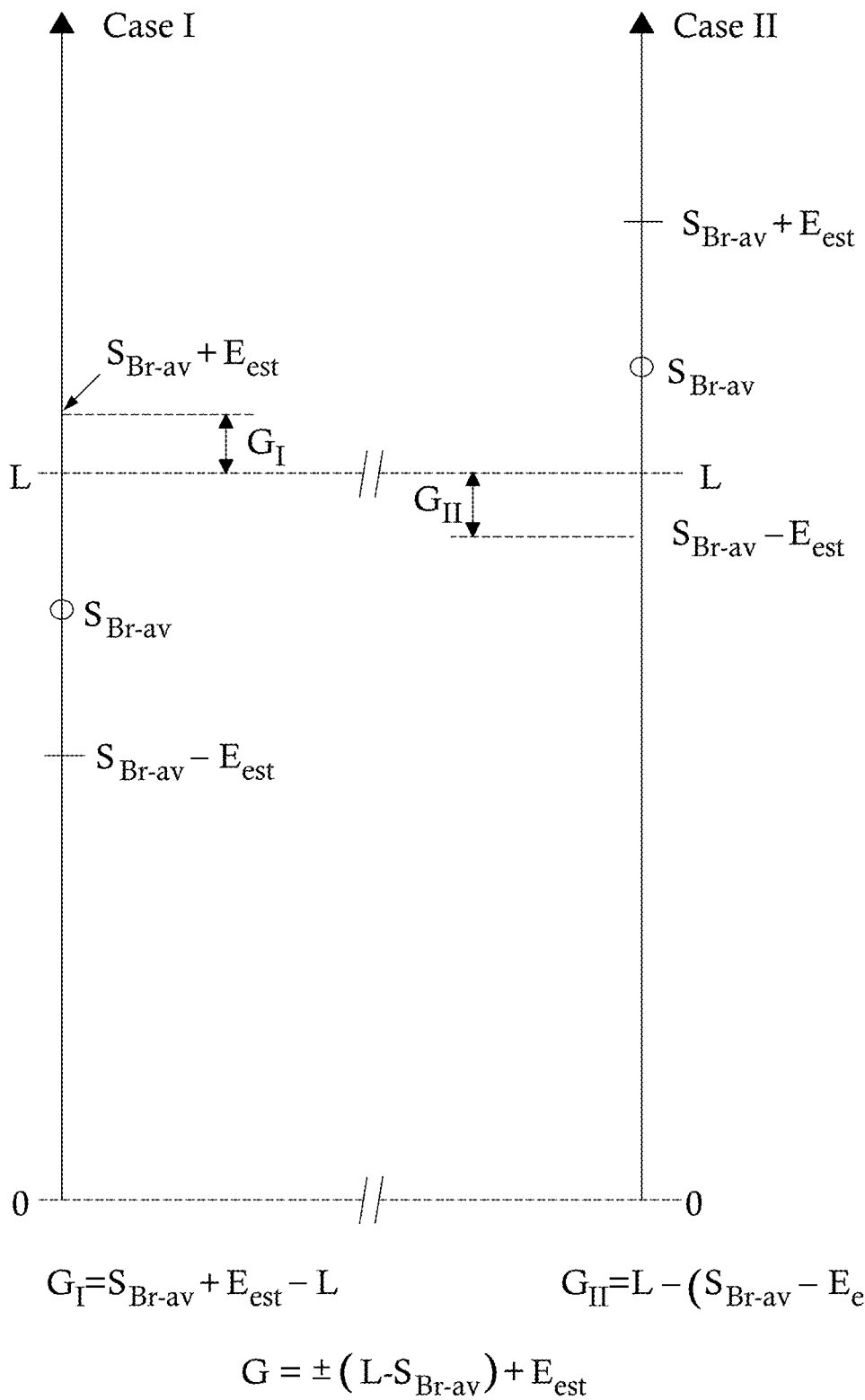
FIG. 6 is a schematic illustration of the use of the gap value, G.

In FIG. 6, case I (left) $S_{Br\text{-}av}$ is smaller than L. Then the minus sign in front of $(L-S_{br\text{-}av})$ in eq. (7) shall be used. In case II (right) the plus sign is used since $S_{Br\text{-}av}$ is then greater than L. The classification is completed when G is changing sign from positive to negative. If $S_{Br\text{-}av}$ and L are almost equal, the calculation of G becomes ambiguous. The ambiguity may be removed by introducing a small hysteresis in the definition of L preventing erratic switching between different gap estimations.

In the method according to the present invention, the gap is calculated in real time during and after the evaluation period. G>0 indicates that further measurement data are required before classification can be performed. Preferably, the magnitude of G is visualized to the user, for example as a bar graph indicator. This is only valid for G>0.

According to embodiments of the invention the gap value is calculated using equation (7) and utilized to classify the concentration of the intoxicating substance in the exhaled breath of the user.

FIGS. 7a-d illustrates how common sensor signal errors and disturbances are managed by the method according to the invention. FIG. 7 shows four graphs (a)-(d) in which the sensor signals representing the tracer (T) and intoxicating substances (S) are plotted as a function of time with a common time scale. In the time period of interest, a tracer concentration peak corresponding to an expired breath is a basic feature in all graphs, along with a coinciding peak corresponding to the intoxicating substance concentration. The T and S signals are sampled with a sampling rate of at least five samples per second. A time period of five seconds, or less than a typical respiratory cycle, will thus comprise 25 or more signal samples which may be used for signal processing, mathematical or statistical analysis. For clarity of illustration, the effects of disturbances are somewhat exaggerated.

In a typical situation, the exact timing of concentration peaks is not controlled. In a preferred embodiment of the present invention, the evaluation period is defined by localizing the target concentration peak by the points in time when the onset and the peak occurs. The location in time of these events directly follows from analysis of the first and second time derivatives of the target concentration signal, and finding their zero crossings.

FIG. 7a illustrates an undisturbed situation involving distinct and coinciding peaks in the T and S channels. The location of the tracer peak concentration is marked with an 'o' in the graph. At this point, the first time derivative is zero. Two inflection points on each side of the peak are marked with 'x' in the graph corresponding to a shift in curvature of the T curve, coinciding with zero crossings of the second time derivative. From the coordinates of the peak and inflection points, the magnitude and width of both the T and S peaks can be calculated.

FIG. 7b illustrates the occurrence of a static offset error occurring in the T channel caused by, for example, an elevated background tracer concentration. Such a situation is common with $H_2O$ as a tracer, and with $CO_2$ in a poorly ventilated situation. Compared to the situation in (a), the tracer curve is now truncated compared to the S peak, which is noticeable as a difference of position of the inflection points between the T and S peaks, resulting in a corresponding difference in widths between the peaks. By comparing the peak widths, it is possible to estimate and correct for the baseline shift.

FIG. 7c shows an example of offset drift in time occurring in both the T and S channels. Such drift may occur during startup of the breath analyzer before steady state conditions have been established. By using the coordinates for the peak maximum and inflection points in one or both channels the drift may be quantified. A correction may be implemented by making use of an interpolated baseline determined by the time slope of the inflection points. The dashed lines illustrate such constructed baselines.

FIG. 7d shows a case of a low signal level in the S channel, resulting from poor the signal to noise ratio. The situation may occur when the subject's breath is weak or not directed towards the sensor location. In such a case, the measured tracer and intoxicating substance concentrations will be small. The substance concentration is expected to be more than two orders of magnitude lower than the tracer concentration. Therefore, stochastic variations, or noise, in the S channel is likely to be a limiting factor to resolution and accuracy. By averaging the S signal over several samples, it may still be possible to estimate the peak magnitude with sufficient accuracy to allow classification whether a preset breath substance concentration is exceeded or not. For example, averaging over four signal samples is expected to improve the resolution by a factor $\sqrt{4}=2$, for the case of randomly fluctuating noise.

Both the measurement result and error are according to the invention computed in real time by accumulating sensor data representing both the concentration of a tracer substance, e g $CO_2$, or water vapor, $H_2O$, always present in human expiratory air, and simultaneously data representing the concentration of an intoxicating substance, e g ethyl alcohol. The real time calculation and the continuous classification speeds up the process significantly. An advantage afforded by the present invention is that a normal detection procedure (no intoxicating substance) is always fast, while on indication of presence of an intoxicating substance (or tampering of the procedure) the classification process is allowed to take longer time. A short process time for the normal (no intoxicating substance) case is considered as critical for acceptance from users. Further, a feedback may give incitement for the user to take actions facilitating the analysis, for example leaning towards the sensor inlet etc. The possibility to give a feedback on the status of the classification process is a further advantage of the invention.

The embodiments described above are to be understood as illustrative examples of the system and method of the present invention. It will be understood that those skilled in the art that various modifications, combinations and changes may be made to the embodiments. In particular, different part solutions in the different embodiments can be combined in other configurations, where technically possible.

The invention claimed is:

1. A method for determining a concentration of an intoxicating substance in the exhaled breath of a user and classifying the determined concentration, the method comprising:
providing a breath analysis system comprising:
a measuring unit in connection with, and under the control of, a control unit comprising a central processing unit (CPU) and associated memory;
using the control unit to control the measuring unit, and using the measuring unit to repetitively sample (i) a sensor signal representing the instantaneous concentration of the intoxicating substance, and (ii) a sensor signal representing the instantaneous concentration of a tracer substance;
using the control unit to perform the following steps:
analyze the tracer substance signal samples;
determine if a peak in the tracer substance signal is detected and, if a peak in the tracer substance signal is detected, define an evaluation period relating to the duration of the tracer substance peak and not exceeding the duration of the tracer substance peak;
calculate, using the tracer signal samples and the intoxicating substance signal samples sampled during the evaluation period, a running average of the breath concentration of the intoxicating substance and a standard deviation representing an estimate of the associated statistical spread of the running average of the breath concentration of the intoxicating substance;
classify the concentration of the intoxicating substance using the average of the breath concentration of the intoxicating substance and the estimate of the associated statistical spread and comparing with a predetermined concentration limit, L; and
determine that the concentration of the intoxicating substance is acceptable if the concentration of the intoxicating substance is below the predetermined concentration limit, L;
wherein the breath analysis system further comprises a vehicle drivability control unit in connection with the control unit, and wherein the control unit is arranged to, if the classification result is that the concentration of the intoxicating substance user is not acceptable, instruct the vehicle drivability control unit to not allow the user to drive the vehicle.

2. The method according to claim 1, wherein the method comprises the further step, to be taken during the evaluation period, of:
if the estimate of the associated statistical spread indicates that the comparison can not be performed with a predetermined level of accuracy within the evaluation period, return to the sampling step to await a further peak in the tracer substance signal detection having an associated further evaluation period, and during which further evaluation period, the calculation of the running average of the breath concentration of the intoxicating substance and the associated statistical spread includes the tracer signal samples and the intoxicating substance signal samples associated with the present evaluation period and with at least the previous evaluation period.

3. The method according to claim 2, wherein the calculation of the running average of the breath concentration of the intoxicating substance and the associated statistical spread includes the tracer signal samples and the intoxicating substance signal samples associated with the present evaluation period and all previous evaluation periods.

4. The method according to claim 1, wherein the step of analyzing the tracer substance signal samples evaluation period comprises:
analyzing a running set of the tracer substance signal samples and if an increasing slope is detected, the increasing slope indicative of a possible peak in the tracer substance signal, initiate an evaluation period; and
wherein, in the calculating step, the classification is performed only if the analysis of the running set of the tracer substance signal samples shows that the increasing slope was followed by a subsequent decreasing slope indicative of a peak in the tracer substance signal during the evaluation period.

5. The method according to claim 4, wherein if no decreasing slope could be detected in the running set of the tracer substance signal samples within a predetermined time period, the running average of the breath concentration of the intoxicating substance and the associated statistical spread are discarded and the process returns to the sampling step to await a further increasing slope.

6. The method according to claim 5, wherein the evaluation period comprises the steps of:
calculating a running average breath concentration, $S_{Br\text{-}av}$, of said intoxicating substance signal for the increasing number of intoxicating substance signal samples of the evaluation period, the breath concentration calculation based on the relative magnitude between the intoxicating substance signal and the tracer substance signal and calculating a statistical variance, $S_{Br}\sigma$, of the breath concentration as the estimate of the associated statistical spread;
calculating a gap value, G, indicating if a reliable classification can be performed, the gap value being a function of at least the current calculated running average breath concentration $S_{Br\text{-}av}$, and the statistical variance, $S_{Br}\sigma$,
repeating the steps of calculating for increasing number of sensor signal samples until the gap value indicates that a classification can be performed,
performing the classification by comparing the running average breath concentration with the predetermined concentration limit, L,
analyzing the slope of the tracer signal samples, and
if a decreasing slope in consecutive tracer signal samples is detected within the evaluation period the existence of a peak is determines as verified and the classification is determined to be correct and the classification result is outputted and the classification process is ended, and if no decreasing slope in consecutive tracer signal samples is detected within the evaluation period, the evaluation period is ended, the calculated running average breath concentration, $S_{Br-av}$, the statistical variance of the breath concentration, $S_{Br}\_\sigma$, the gap value, G and the classification are discarded and the method returns to the steps of sampling the sensor signals and analyzing the tracer substance signal samples.

7. The method according to claim 6, wherein the step of calculating further comprises the step of:
calculating a running total measurement error estimate, $E_{est}$, the running total measurement error estimate being a function of at least the standard deviation of the breath concentration, a predetermined multiplicative error component, $E_{mult}$, multiplied with the average breath concentration, and a predetermined additive error component, $E_{add}$; and wherein the gap value, G, is a function of at least the predetermined concentration limit, the running average breath concentration and the running total measurement error estimate.

8. The method according to claim 6, comprising a further substep of displaying a representation of the gap value.

9. The method according to claim 8, further comprising calculating a rate of change of the gap value, and estimating from the rate of change the remaining time to perform a classification and displaying a representation of the remaining time.

10. The method according to claim 1, wherein the step of analyzing the tracer substance signal to detect a peak comprises calculating and analyzing the first and/or second time derivative of the tracer signal.

11. The method according to claim 10, wherein the peak onset time corresponds to a first zero crossing in the second derivative and the peak decline time corresponds to a consecutive zero crossing in the second derivative of the tracer signal.

12. The method according to claim 1, wherein the evaluation period is terminated after a time corresponding to a predetermined average exhalation time period of a human respiratory cycle.

13. The method according to claim 6, wherein the running average breath concentration over m time samples, $S_{Br-av}$, is calculated according to $$S_{Br-av}(m) = \Sigma_m S_{Br-i}/m,$$

wherein $S_{Br-i}$ is equal to the instantaneous breath concentration for each of the m time samples, and the associated statistical spread, $S_{Br}\_\sigma$, is the standard deviation calculated according to $$S_{Br-\sigma}(m) = \sqrt{\left(\frac{1}{m-1}\sum_m (S_{Br-i} - S_{Br-av})^2\right)},$$

wherein, m, is the number of time samples and the total measurement error estimate, $E_{est}$, is calculated according to $$E_{est} = M*S_{Br-\sigma}(m) + E_{add} + E_{mult}*S_{Br-av}$$

wherein M is a predetermined multiple of the standard deviation, $S_{Br}\_\sigma$, $E_{add}$ is a predetermined additive error component, and $E_{mult}$ is a predetermined multiplicative error component.

14. The method according to claim 9, wherein the gap value, G, is calculated according to $$\pm(L - S_{Br-av}) + E_{est}$$

wherein the addition of $(L - S_{Br-av})$ and $E_{est}$ is used when $S_{Br-av}$ is greater than L, and the difference of $(L - S_{Br-av})$ and $E_{est}$ is used when $S_{Br-av}$ is smaller than L, and wherein the classification is determined as reliable then the condition $G < 0$ is fulfilled.

15. The method according to claim 6, wherein if no peak is detected in the tracer signal during a first predetermined time period a warning of missing data is issued.

16. The method according to claim 2, wherein if no decreasing slope is detected in the tracer signal during a second predetermined time period a warning or an instruction is issued to direct the user to take action.

17. A breath analysis system for determining a concentration of an intoxicating substance in the exhaled breath of a user and classifying the determined concentration, the breath analysis system comprising:
a measuring unit in connection to, and under control of, a control unit comprising a central processing unit (CPU) and associated memory, the measuring unit being in connection with a human/machine interface unit, the measuring unit comprising an inlet which is arranged to direct a breath sample from a user into a measurement cell of the measuring unit, the inlet being provided in a position that, during use, is in front of the user, wherein the control unit is configured to:
control the measuring unit, whereby to sample repetitively sample (i) a sensor signal representing the instantaneous concentration of the intoxicating substance, and (ii) a sensor signal representing the instantaneous concentration of a tracer substance;
determine if a peak in the tracer substance signal is detected, and if a peak in the tracer substance signal is detected, define an evaluation period relating to the duration of the tracer substance peak and not exceeding the duration of the tracer substance peak;
calculate, using the tracer signal samples and the intoxicating substance signal samples sampled from the measuring unit during the evaluation period, a running average of the breath concentration of the intoxicating substance and a standard deviation representing an estimate of the associated statistical spread of the running average of the breath concentration of the intoxicating substance;
classify the concentration of the intoxicating substance using the average of the breath concentration of the intoxicating substance and the estimate of the associated statistical spread and comparing with a predetermined concentration limit, L; and
determine that the concentration of the intoxicating substance is acceptable if the concentration of the intoxicating substance is below the predetermined concentration limit, L; and
a vehicle drivability control unit in connection with the control unit, and wherein the control unit is arranged to, if the classification result is that the concentration of the intoxicating substance user is not acceptable, instruct the vehicle drivability control unit to not allow the user to drive the vehicle.

18. The breath analysis system according to claim 17, wherein the control unit is further arranged to:
if the estimate of the associated statistical spread indicates that the comparison can not be performed with a predetermined level of accuracy within the evaluation period, store the calculated running average of the breath concentration of the intoxicating substance and the estimate of the associated statistical spread in the memory associated with the control unit, and control the measuring unit to continue sampling to await a further peak in the tracer substance signal having an associated further evaluation period, and during which further evaluation period, the calculation of the running average of the breath concentration of the intoxicating substance and the standard deviation representing the estimate of the associated statistical spread includes the tracer signal samples and the intoxicating substance signal samples associated with the present evaluation period and with at least the previous evaluation period.

19. The breath analysis system according to claim 18, wherein the control unit is arranged to include the tracer signal samples and the intoxicating substance signal samples associated with the present evaluation period and all previous evaluation periods in the calculation of the running average of the breath concentration of the intoxicating substance and the standard deviation representing the estimate of the associated statistical spread.

20. The breath analysis system according claim 17, wherein the control unit is further arranged to in the step of analyzing the tracer substance signal samples evaluation period:
    analyze a running set of the tracer substance signal samples and if an increasing slope is detected, the increasing slope indicative of a possible peak in the tracer substance signal, initiate an evaluation period; and
    wherein, in the calculating step, the classification is performed only if the analysis of the running set of the tracer substance signal samples shows that the increasing slope was followed by a subsequent decreasing slope indicative of a peak in the tracer substance signal during the evaluation period.

21. The breath analysis system according to claim 17, wherein the control unit is arranged to forward the classification result to the human/machine interface unit, which is arranged to output a representation of the classification result to a user.

* * * * *